United States Patent [19]

Ikeda

[11] Patent Number: 4,682,190
[45] Date of Patent: Jul. 21, 1987

[54] IMAGE PROCESSING APPARATUS FOR COMBINING IMAGE AND CHARACTER DATA

[75] Inventor: Yoshinori Ikeda, Tokyo, Japan

[73] Assignee: Canon Kabushiki Kaisha, Tokyo, Japan

[21] Appl. No.: 869,824

[22] Filed: May 30, 1986

Related U.S. Application Data

[63] Continuation of Ser. No. 586,733, Mar. 6, 1984, abandoned.

[30] Foreign Application Priority Data

| Mar. 8, 1983 [JP] | Japan | 58-36673 |
| Mar. 17, 1983 [JP] | Japan | 58-44989 |
| Mar. 17, 1983 [JP] | Japan | 58-44990 |
| Mar. 17, 1983 [JP] | Japan | 58-44991 |

[51] Int. Cl.$^4$ ............................................. G01D 15/14
[52] U.S. Cl. .................................... 346/154; 346/160
[58] Field of Search ............ 346/154, 157, 160, 108; 358/283, 284, 296, 298, 300, 302; 400/119; 101/DIG. 13; 355/5

[56] References Cited

U.S. PATENT DOCUMENTS

| 4,047,202 | 9/1977 | Poetsch | 358/29 |
| 4,251,837 | 2/1981 | Janeway, III | 358/284 X |
| 4,259,694 | 3/1981 | Liao | 358/283 |
| 4,316,199 | 2/1982 | Greenig et al. | 346/160 |
| 4,323,974 | 4/1982 | Sekigawa | 358/284 X |
| 4,394,089 | 7/1983 | McIntosh et al. | 358/75 X |

FOREIGN PATENT DOCUMENTS

| 81/02706 | 10/1981 | PCT Int'l Appl. | 358/296 |
| 2062396 | 5/1981 | United Kingdom | 358/296 |

Primary Examiner—Arthur G. Evans
Attorney, Agent, or Firm—Fitzpatrick, Cella, Harper & Scinto

[57] ABSTRACT

An image processing apparatus, for combining image and character data, has a character code buffer for receiving a decoded character signal and generating data presenting a designated character image portion in response a character read address signal, a character generator for converting the readout data to dot data, a character image memory for storing the dot data in a memory area in response to a character write address signal, an image buffer memory for receiving decoded image data and generating data representing a designated half tone image region in response to a half tone read address signal, processing circuit blocks for performing a series of predetermined operations for the readout data, and a half tone image memory for storing the processed data in response to a half tone write address signal.

35 Claims, 35 Drawing Figures

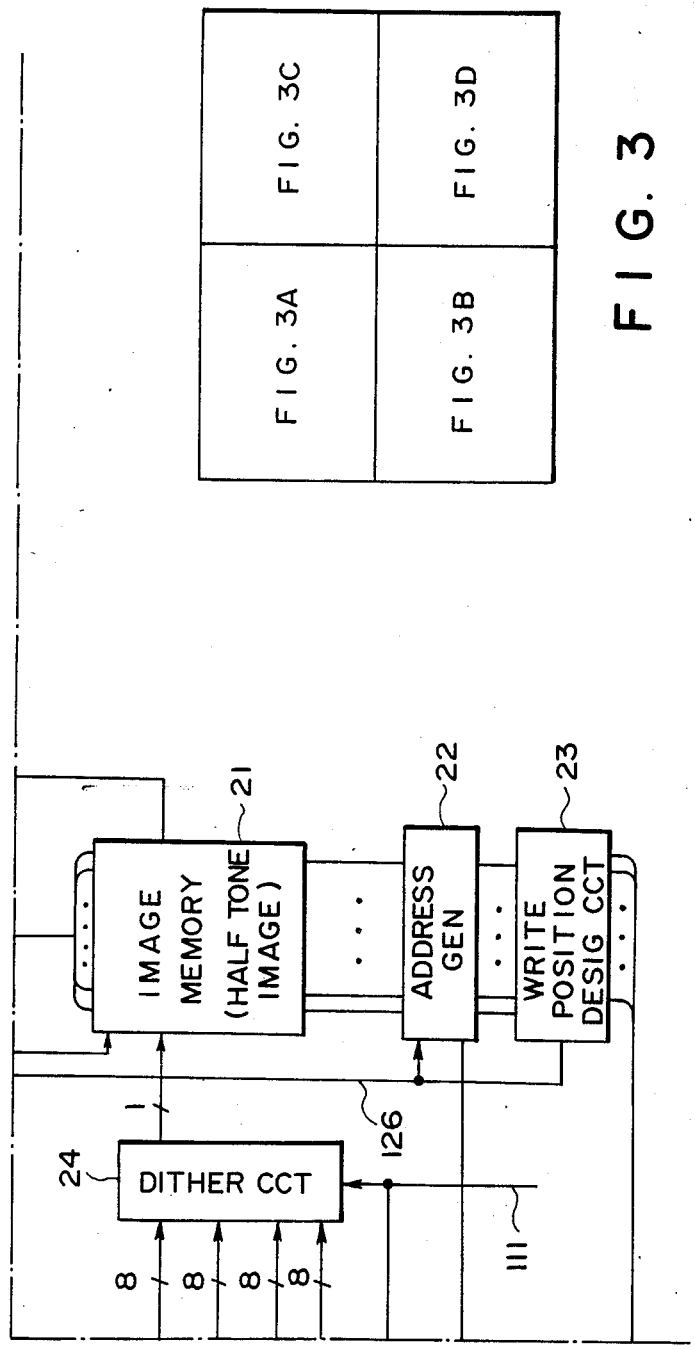

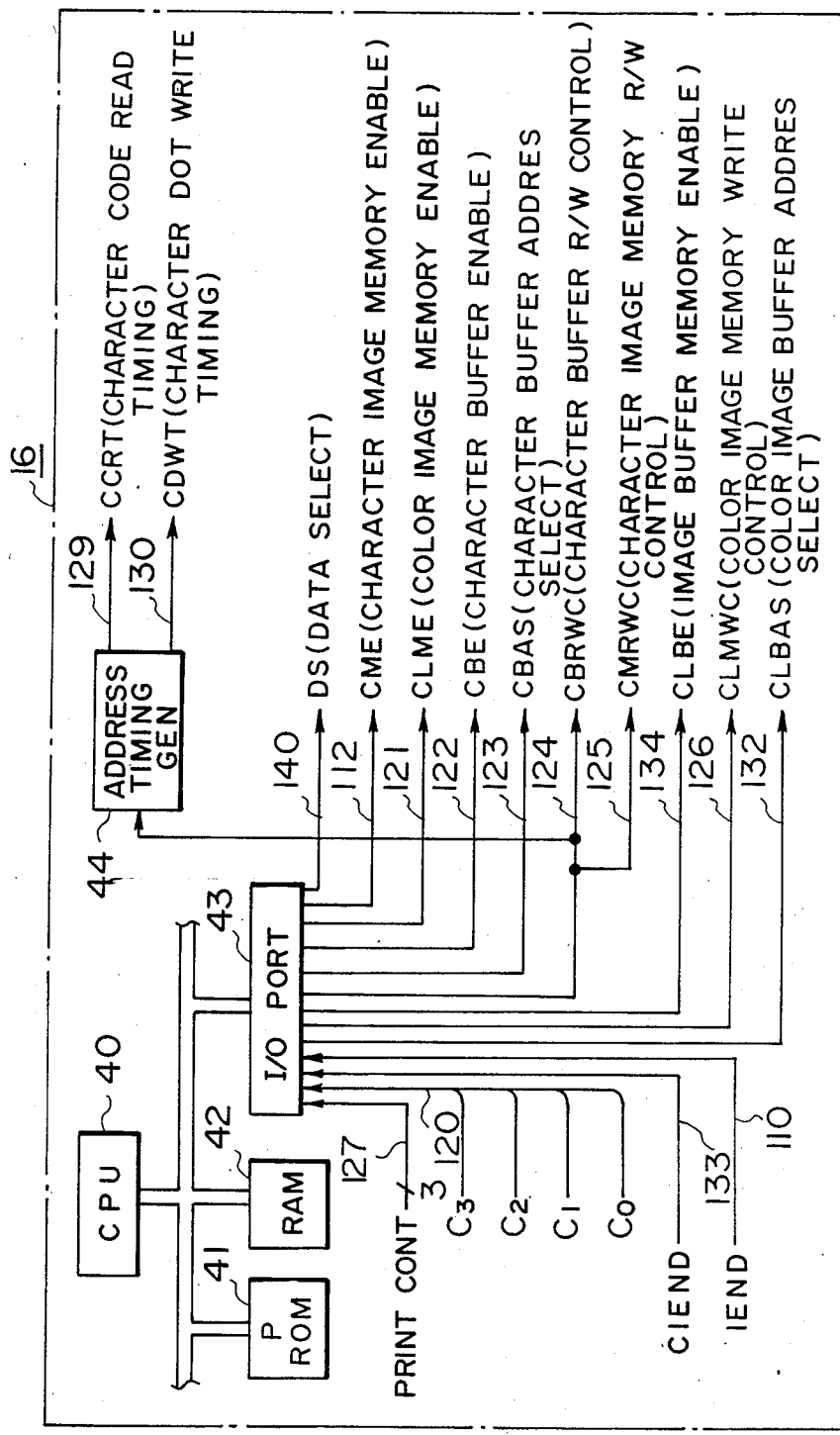
F I G. 9

| COMMAND CODE | | | CONTENTS OF COMMAND |
|---|---|---|---|
| 0 | 0 | 0 | N O P ( NO OPERATION ) |
| 0 | 0 | 1 | CHAR PRINT INSTR |
| 0 | 1 | 0 | COLOR IMAGE PRINT INSTR |
| 0 | 1 | 1 | COMP PRINT INSTR |
| 1 | 0 | 0 | UNUSED |
| 1 | 0 | 1 | CHAR CODE TRANSFER START |
| 1 | 1 | 0 | COLOR IMAGE TRANSFER START |
| 1 | 1 | 1 | UNUSED |
F I G. 10
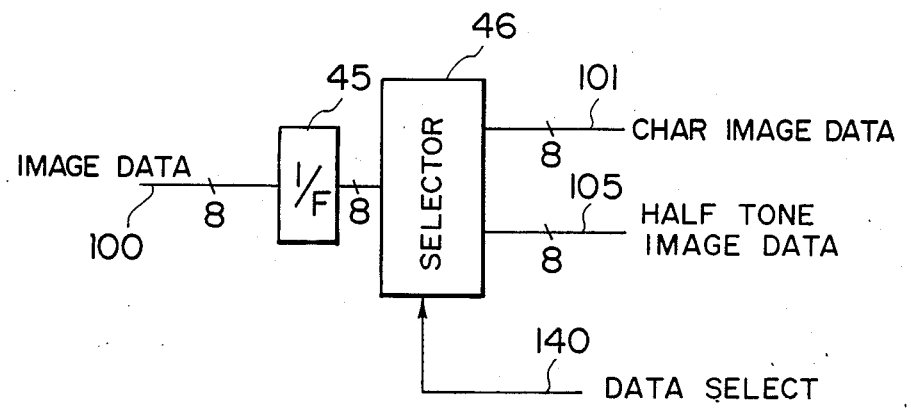
F I G. 11

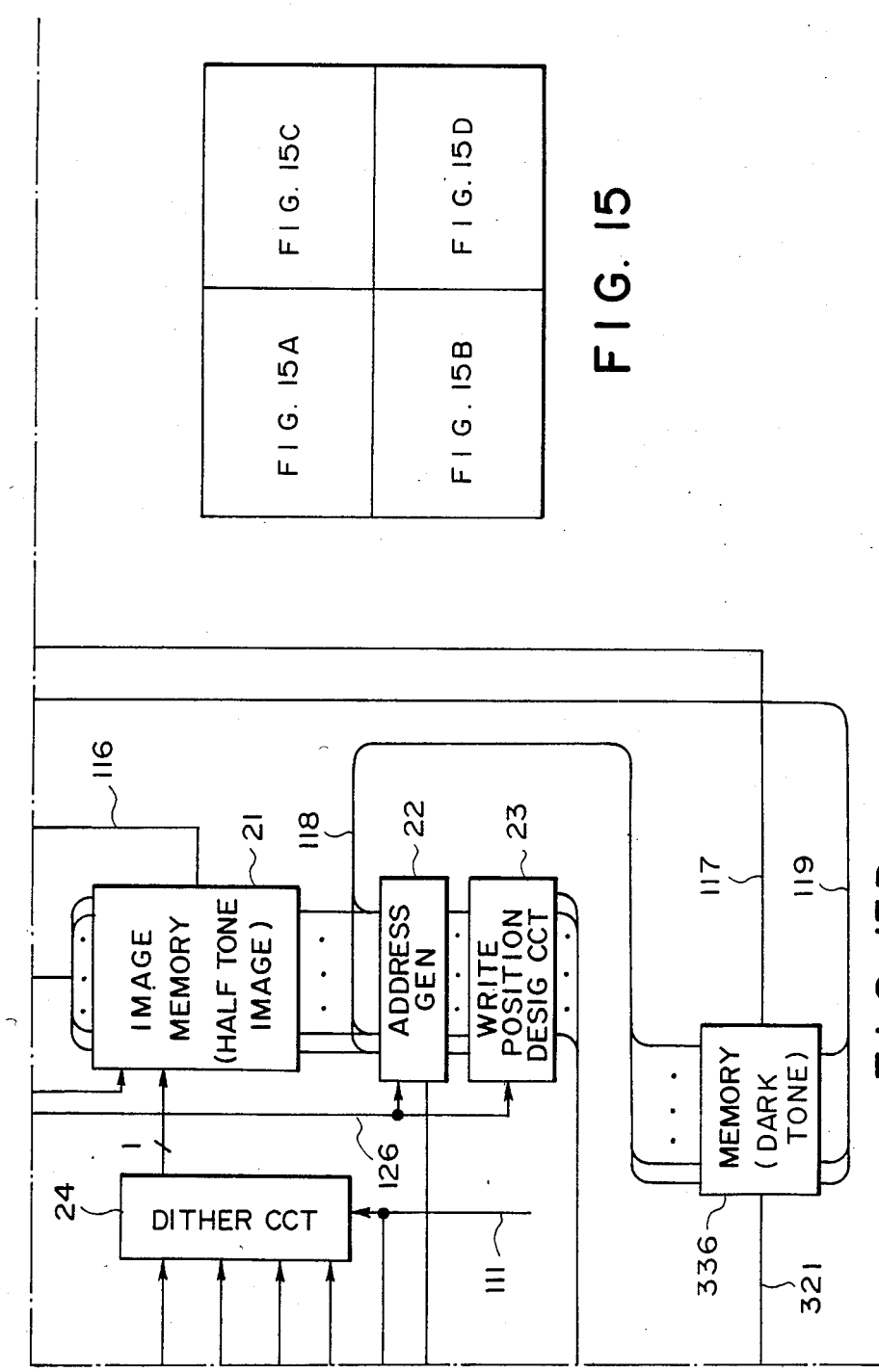

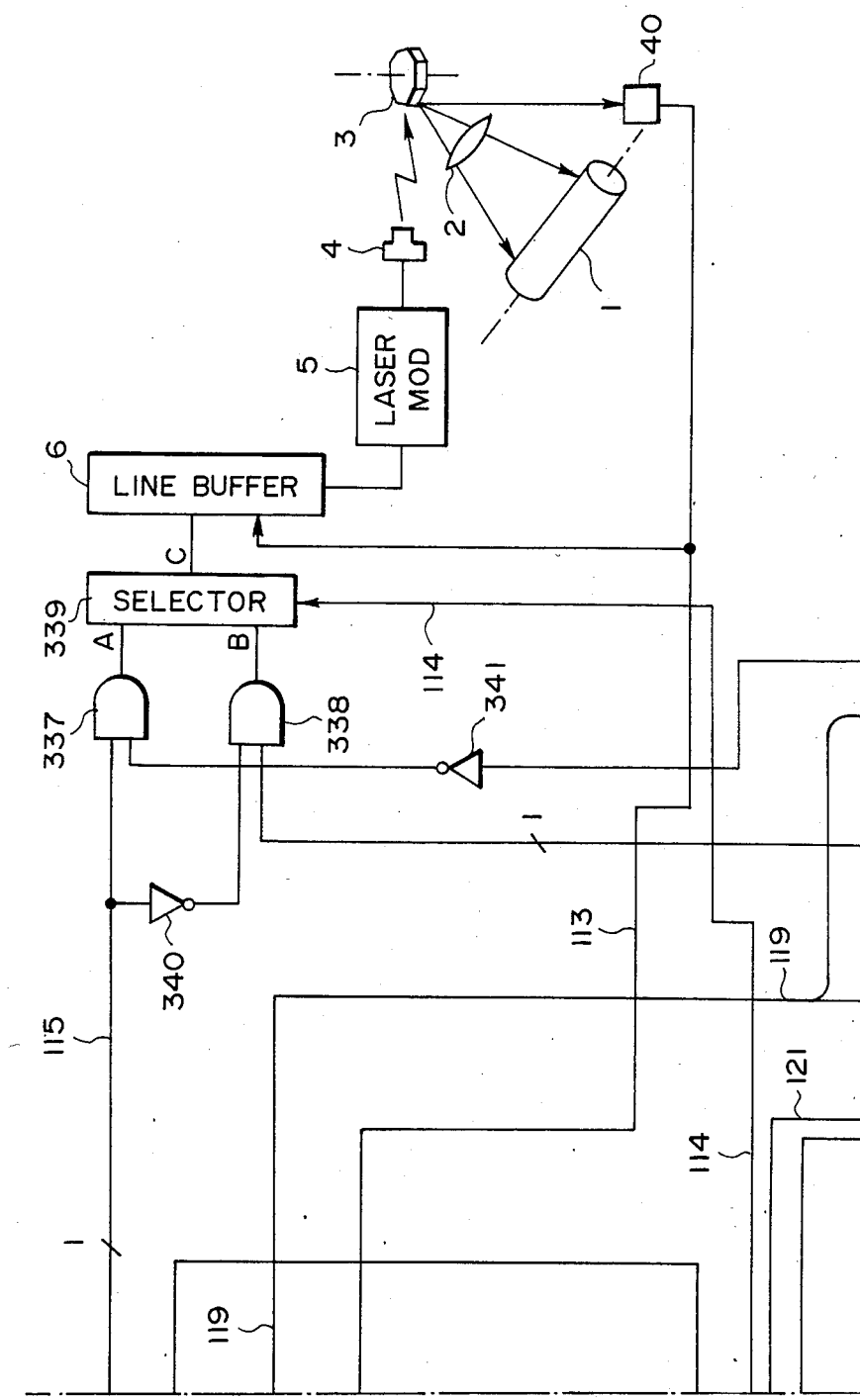

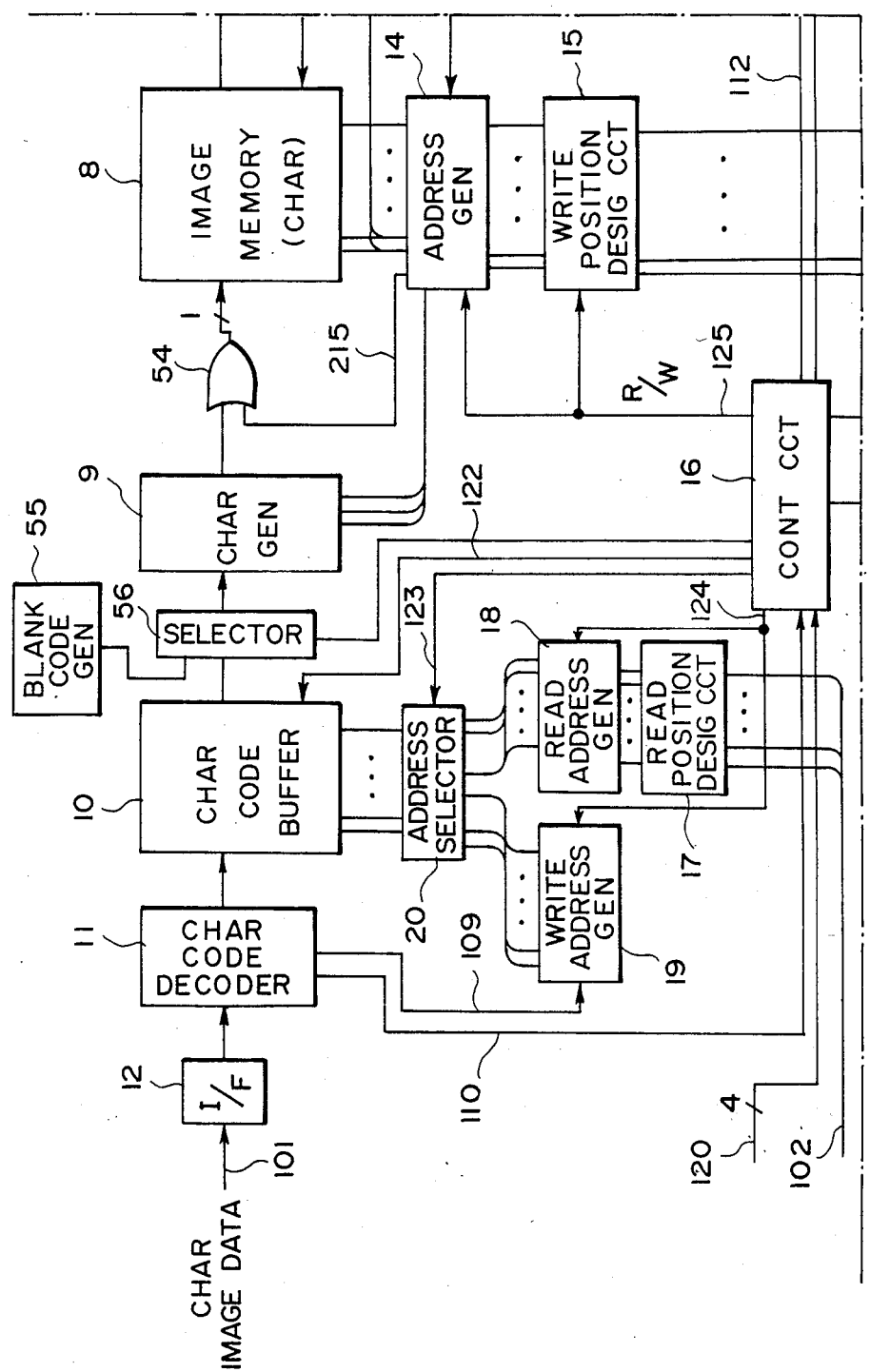
F I G. 18A

IMAGE PROCESSING APPARATUS FOR COMBINING IMAGE AND CHARACTER DATA

This application is a continuation of application Ser. No. 586,733 filed Mar. 6, 1984, now abandoned.

BACKGROUND OF THE INVENTION (1) Field of the Invention

The present invention relates to an image processing apparatus for processing image data such as half tone and line images (e.g., characters), or code data such as a compression code.

(2) Description of the Prior Art

Ink jet, thermal transfer and laser beam printers are conventionally known as image processing apparatuses for reproducing a half tone image from a dot image. In order to reproduce the half tone image in these apparatuses, a dither method or a density pattern method is used to reproduce the half tone image by dot modulation of a small region. In particular, the dither method is mainly used to reproduce the half tone image by a color laser beam printer.

Image data supplied from a color video camera or an image file to the color printer of the type described above is temporarily stored in a buffer memory in the color printer and is read out therefrom. In this case, the color printer performs dither processing to print out a dot image obtained in accordance with the density of the transferred image. However, when only one type of image buffer memory is used, character data is mixed with the half tone image data. As a result, the edge sharpness of the character image is degraded by dither processing, resulting in inconvenience.

In particular, in an image consisting of characters and lines with high contrast, the character and line edges become vague after dither processing. In addition to this disadvantage, the density of the solid image portion is decreased, resulting in a loss of image sharpness.

In addition, when a half tone image is superimposed onto characters, for example, the half tone image is copied by a known copying apparatus. The resultant copying sheet is used as a printing sheet and is printed with the characters by a hard copy printer. However, the operation of this method is time-consuming and cumbersome. Furthermore, it is difficult to align the image with the characters, resulting in an impractical application.

On the other hand, a composite type electrophotographic copying apparatus is known, as shown in FIG. 1. This apparatus has a copying unit and a line printer (e.g., laser beam printer). A copy image of an original placed on an original table 150 is superimposed on a printer character output supplied from an external device (not shown) such as a host computer through a signal line 163. The composite image is then printed out on a copying sheet 161. The original table 150 is illuminated by an exposure lamp 151, and light reflected thereby is focused on the surface of a photosensitive drum 159 through mirrors 152 to 155 and a lens 156, so that a latent image corresponding to the original image is formed on a surface portion of the photosensitive drum 159. On the other hand, character data is supplied from the external device (not shown) to an interface control circuit 162 where it is converted to dot data. The dot data modulates a laser beam generated from a semiconductor laser 164. A polygonal mirror 157 serves to horizontally scan the laser beam. When the laser beam is modulated and scanned in this manner, a latent character image is superimposed on a latent original image on the surface of the photosensitive drum 159. Thereafter, the normal electrophotographic process of consecutive development, transfer, and fixing is performed on a composite image consisting of both the half tone and character images. According to the apparatus described above, the half tone image is formed independently of the character image and is printed out. For example, when characters are superimposed on a substantially dark portion of the half tone image, the characters cannot be easily read, as shown in FIG. 2. In particular, the characters superimposed on the solid portion cannot be read entirely.

SUMMARY OF THE INVENTION

It is an object of the present invention to overcome the problems described above.

It is another object of the present invention to provide an image processing system wherein the edge sharpness of a line image consisting of characters or the like will not be lost when the line image is combined with a half tone image such as a photographic image, and at the same time the half tone image can be reproduced with high quality.

It is still another object of the present invention to provide an image processing apparatus capable of clearly discriminating between a line image portion, such as characters, and the superimposed half tone image portion.

It is still another object of the present invention to provide an image processing apparatus capable of clearly discriminating between a line image portion, such as characters, and a superimposed half tone image portion, irrespective of the color of the background portion.

It is still another object of the present invention to provide an image processing apparatus capable of combining a line image, such as characters, with a half tone image so as to reproduce a desired color image.

It is still another object of the present invention to provide an image processing apparatus capable of reproducing a line image, such as characters, or a half tone image in a desired color.

It is still another object of the present invention to provide an image processing apparatus capable of combining a clear character image at a desired position of a reproduced image including a half tone image portion.

It is still another object of the present invention to provide a general-purpose image processing system which can be connected to any other equipment.

It is still another object of the present invention to provide an image processing system capable of performing proper processing even if the input status (e.g., half tone dot data, character codes and compressed codes) of the image data differ from each other.

According to the present invention, the character image can be combined with the half tone image without degrading the edge sharpness of the character image. In addition, the character and half tone images can be moved to specified regions, respectively. Therefore, an effective, aesthetic design using the character and half tone images can be provided.

Furthermore, according to the present invention, a character image or the like can be entered using codes, so that the apparatus of the present invention can be connected to any other equipment, thereby providing a general-purpose image processing apparatus.

Furthermore, the character image can be reproduced in any color in accordance with the color of the half tone image as the background portion.

Furthermore, the compression codes from, for example, a facsimile system can be received by merely adding input data discrimination commands. Therefore, various types of image entered from a variety of equipment can be combined.

Furthermore, since at least one of the half tone and character images can be reproduced in color, images suitable for subsequent clerical jobs can be obtained by changing the color of characters in units of specific data.

Furthermore, according to the present invention, since the character image can be clearly reproduced irrespective of the color, hue, and density of the character image, the character image can be clearly discriminated from the solid image portion, unlike the conventional case wherein the character image cannot be clearly discriminated from the half tone image.

Other objects, features and advantages will be apparent from the following detailed description with reference to the accompanying drawings, and appended claims.

BRIEF DESCRIPTION OF THE DRAWINGS

FIG. 3 shows how FIGS. 3A through 3D are arranged to form a block diagram showing the overall configuration of a color image recording apparatus according to a first embodiment of the present invention;

FIG. 9 is a detailed block diagram showing a control circuit 16;

FIG. 10 is a table for explaining various commands;

FIG. 11 is a block diagram of a data input section;

FIG. 15 shows how FIGS. 15A through 15D are arranged to form a block diagram showing the overall configuration of a color image recording apparatus according to a third embodiment of the present invention;

FIG. 18 shows how FIGS. 18A through 18D are arranged to form block diagram showing the overall configuration of a color image recording apparatus according to a fourth embodiment of the present invention.

DETAILED DESCRIPTION OF THE PREFERRED EMBODIMENTS

Figure 1:
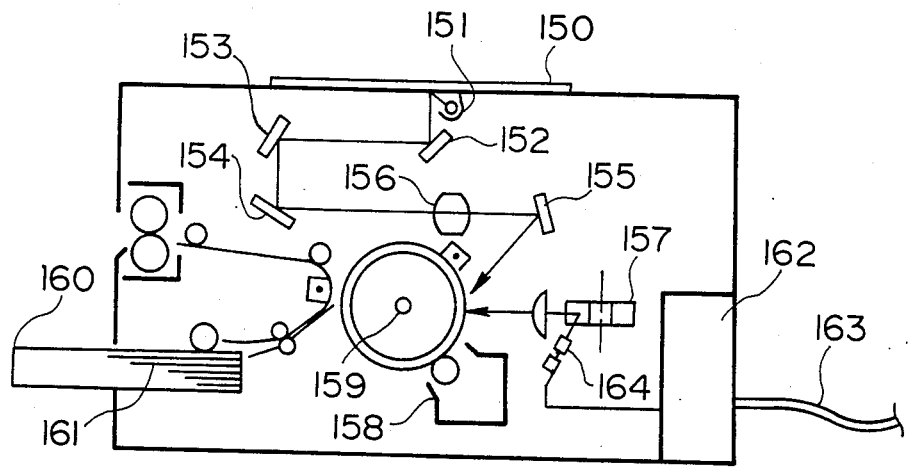
FIG. 1 a schematic sectional view showing a conventional composite type copying apparatus.
Figure 2:
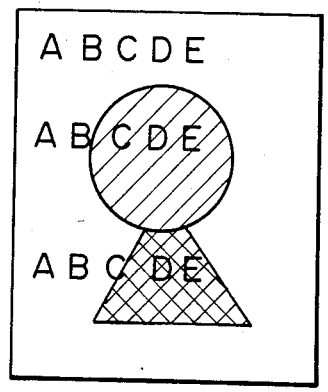
FIG. 2 is a representation showing the state wherein characters (i.e., letters) are partially superimposed on a dark image.

The present invention will be described with reference to the accompanying drawings.

FIGS. 3A through 3D are a block diagram showing the overall configuration of a color recording apparatus according to a first embodiment of the present invention. This color image recording apparatus receives a character code string signal (FIG. 4) as character image data 101, a color discrimination signal 104 having R (red), G (green) and B (blue) components and vertical and horizontal synchronizing signals 106V and 106H, as shown in FIG. 5, which are supplied as color image data, and an image signal 105 supplied from external equipment such as a host computer. In addition, image trimming position designation signals 102, 103, 107 and 108 are also externally supplied to the color image recording apparatus. It should be noted that numerals on lines in FIG. 3 indicate the numbers of bits, respectively. Interface circuits 12 and 29 serve to store the character image data 101 and the half tone image data in a character code decoder 11 and an image buffer memory 28, respectively.

Figure 4:
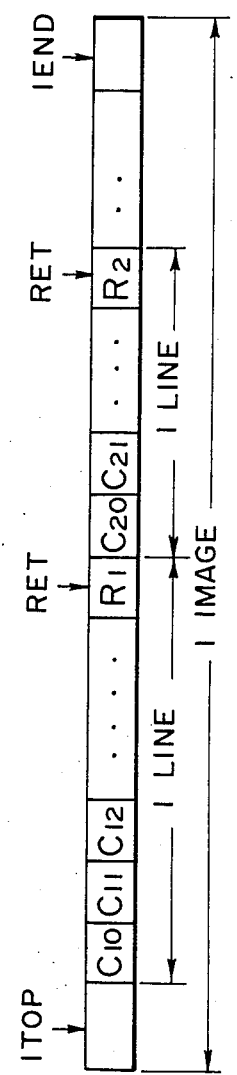
FIG. 4 shows the format of character image data.
Figure 5:
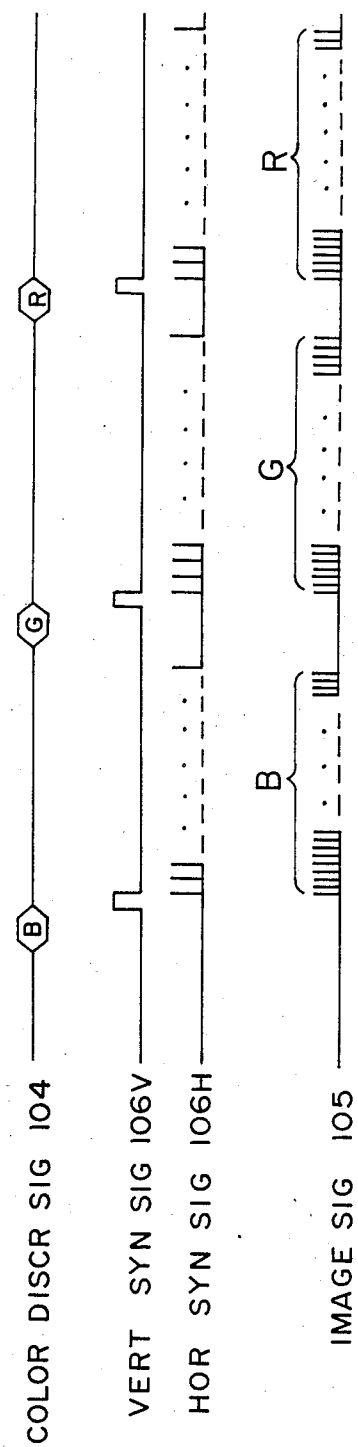
FIG. 5 is a timing chart of signals constituting color image data.

FIG. 4 shows the character image data string signal. The data format of this signal includes character string data $C_{10}$, $C_{11}$, $C_{12}$... of the first line which follow a start discrimination code ITOP. A RET code is inserted after the end character of each line. Therefore, when the input device (i.e., color image recording apparatus) detects the RET code, carriage return is performed. FIG. 4 shows a first-line RET code $R_1$ and a second-line RET code $R_2$. An end code IEND of a character image is inserted at the end of the last line of the character image, thereby indicating the end of the character image data. When the color image recording apparatus receives this end code IEND, it discriminates the end of the character image data.

The character image data 101 of one frame supplied in the manner described above is stored in a character code buffer 10. In this case, the special codes (ITOP, RET and IEND) are decoded by a character code decoder 11, so that a character image storage start/line return designation signal 109 and a storage end signal 110 are generated. A write address generator 19 sequentially generates address signals in response to the signal 109.

Figures 6, 7A, 7B:
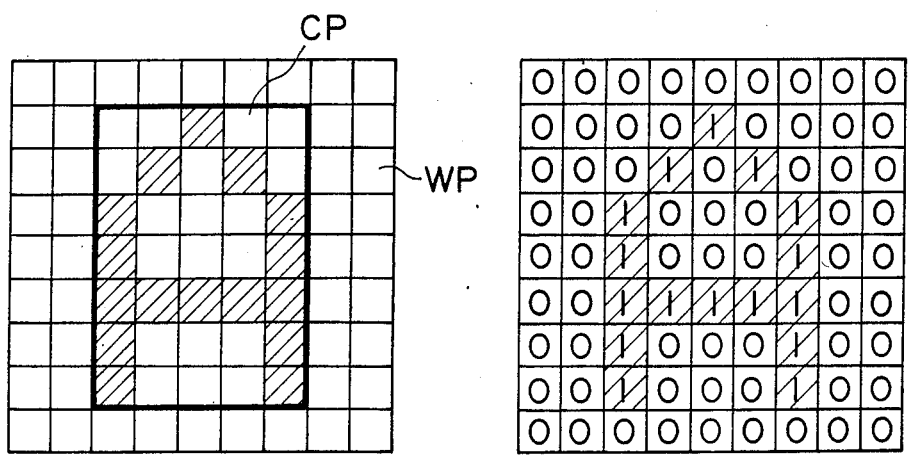
FIG. 6 is a representation showing a character screen stored in a character code buffer.
FIGS. 7A and 7B respectively are representations showing a character whose data are entered in a character generator and converted to dot data.

FIG. 6 shows a character storage pattern. Characters A, B, ..., a, b, c, ... are represented by ASCII codes. The color image recording apparatus uses a laser beam system wherein an image to be reproduced is expressed as a dot image. Therefore, the character code string must be converted to the dot form. For this purpose, this embodiment employs a character generator 9.

The character generator 9 generally has a character portion CP and a white portion WP, as shown in FIG. 7A. When character A is converted to dot data in accordance with the format shown in FIG. 7A, data in the 9×9 pel (picture element) matrix are also converted to dot data, as shown in FIG. 7B. Meanwhile, the color image recording apparatus also receives an external region data signal 102 (row and column data of the character code image) which represents which region of one-character image is printed out.

For example, in the character code image shown in FIG. 6, when a printout start character and a printout end character are given by coordinates $(m_1, n_1)$ and $(m_2, n_2)$, the character data surrounded by the thick line are read out from the character code buffer 10. In response to the printout designation data $(m_1, n_1)$ and $(m_2, n_2)$ included in the region data signal 102, a read position designation circuit 17 and a read address generator 18 generate read address signals for the designated region.

On the other hand, the designation signal 103 represents which print image region the designated character image is printed in. The write region for printout is given by a write start position pel number (scanning line number) $(m_1', n_1')$. and a write end position pel number $(m_2', n_2')$. An image memory write position designation circuit 15 and an image memory address generator 14 generate write addresses of an image memory 8.

The character code image of a designated region which is read out frdm the character code buffer 10 in this manner is converted by the character generator 9 to dot data. This dot data is stored in a designated region of the image memory whose data is printed out. The data status is illustrated in FIGS. 7A and 7B.

Processing of color half tone image supplied as a density data of colors R, G and B will now be described. As shown in FIG. 5, the color half tone image consists of the R-G-B color discrimination signal 104, the vertical and horizontal synchronizing signals 106V and 106H, and 8-bit density data (i.e., image signal) 105 for each pel of the image. In this embodiment, 8-bit parallel density data is used. However, 8-bit serial density data may be used instead. The R, G and B components are stored in buffer memories 28-1, 28-2 and 28-3 respectively in accordance with the color discrimination signal 104.

The synchronizing signals 106V and 106H are supplied to a write address generator 32, so that necessary address signals are supplied from an address selector 30 to the image buffer memories 28-1, 28-2 and 28-3. Thus, image signal components of the respective colors are stored in the corresponding image buffer memories 28-1, 28-2 and 28-3.

Thereafter, designation of the region to be printed out of the half tone image stored in the buffer memory is performed in response to the signal 107 simultaneously supplied from external equipment when the character code buffer 10 is subjected to read access. This region designation is performed by giving the printout start point, the pel number, and the scanning line number, so that address signals for the image memories 28-1, 28-2 and 28-3 are generated by an address generator 31.

In the read mode, identical pels are simultaneously read out as Y, M and C components from the yellow (Y) image buffer memory (for storing the B signal) 28-1, the magenta (M) image buffer memory (for storing the G signal) 28-2, and the cyan (C) image buffer memory (for storing the R signal) 28-3. It should be noted that complementary color signals of the B, G and R components are generated as the Y, M and C signals. The color signals read out in the manner described above are subjected to predetermined processing and are then stored in a half tone image memory 21. As previously described, the write start position is designated by the signal 108 such that the image region is printed out at the designated position. In response to this, an image memory write position designation circuit 23 and an image memory address generator 22 generate an address signal for the designated position of the image memory 21. This operation is the same as in the character image data processing and is illustrated in representations C and D of FIG. 8.

The color density data of the respective pels which are read out from the image buffer memories 28-1, 28-2 and 28-3 are gamma-transformed (density-converted) by a $\gamma$ correction circuit 27, so as to match the characteristics of the color image recording apparatus. In addition, these data are then subjected to masking by a masking processor 26 which is well-known in printing technique. These masked data are then subjected to UCR processing (undercolor removal) by means of a UCR processor 25. The UCR-processed data are then stored as dot data (binary data of logic "1" or "0") in a designated position of the image memory 21. It should be noted that dither processing is an electrical processing for comparing density data of each pel with its threshold value and generating recording dots to be produced. Alternatively, the dither circuit 24 may comprise a memory such as ROM, which may be directly accessed by using the density data as an address, thereby performing dither processing (dither conversion). In this embodiment, processing by a method such as a density pattern method may be performed to determine the recording dots by comparing one pel with a plurality of threshold values. Processing by the density pattern method can also be referred to as dither processing.

In the color image recording apparatus, a yellow latent image, a magehta latent image, a cyan latent image and a black latent image are sequentially formed on the photosensitive drum 159 in the order named, and yellow, magneta, cyan and black toner images are superimposed on a transfer sheet to obtain a full-color image. Therefore, the image memory 21 has only one-image capacity. As each color image is formed on the photosensitive drum, the color processing described above is performed and at the same time the respective density data (Y, M, C and BK) are transferred into the image memory.

In order to read out data from the character image memory 8 and the half tone image memory 21 and transfer the readout data to a laser modulator 5, these image data are stored as dot data in the image memories 8 and 21 and are assigned to identical addresses for identical pels. In this embodiment, address designation of the image memories 8 and 21 is controlled by the image memory address generator 14. In other words, when the image data are in the image memories 8 and 21, respectively, the read addresses are generated, thereby sending out the character and half tone image dot data of the identical pel.

The dot data read out from the image memories 8 and 21 are superposed by an OR gate 7, and a logically ORed data are supplied to a line buffer 6. The dot data read out from the line buffer 6 are supplied to the laser modulator 5. The laser modulator 5 produces a laser beam 4 in accordance with the dot data. The laser beam 4 modulated in response to the dot data irradiates a photosensitive drum 1 through the lens 2, so that a latent image is formed on a surface portion thereof. The print image formation process is the same as that in the conventional laser beam printer. Y, M, C and BK developing units (not shown) are selectively used. A signal 113 is a horizontal synchronizing signal (BD signal) generated from a sensor 40 when irradiated by the laser beam. The image data are read out from the image memories 8 and 21 in response to the signal 113.

FIGS. 3A through 3D show shows a 4-bit signal 120 for designating the character image color. This signal may be supplied from external equipment such as a host computer or from a switch arranged in the color image recording apparatus. In this embodiment, color designation signal bits $C_0$ to $C_3$ respectively correspond to Y, M, C and BK components. When a color latent image corresponding to the designated bit is formed, the character image output is controlled in response to a signal 112, thereby obtaining a character image having a desired color. Assume that the signal $(C_0, C_1, C_2, C_4) = (1, 1, 0, 0)$ is given. When Y and M latent images are superposed, the character data is read out from the image memory 8, thereby reproducing a red character.

When the character image is combined with the black (BK) component, the character image in the half tone image becomes sharp. In this case, the color designation signal $(C_0, C_1, C_2, C_3)$ becomes $(0, 0, 0, 1)$. Similarly, when the half tone image data is read out from the image memory 21, the data with a desired color may be controlled to be read out. In addition, either a single or a mixed color image can be obtained.

Figure 8:
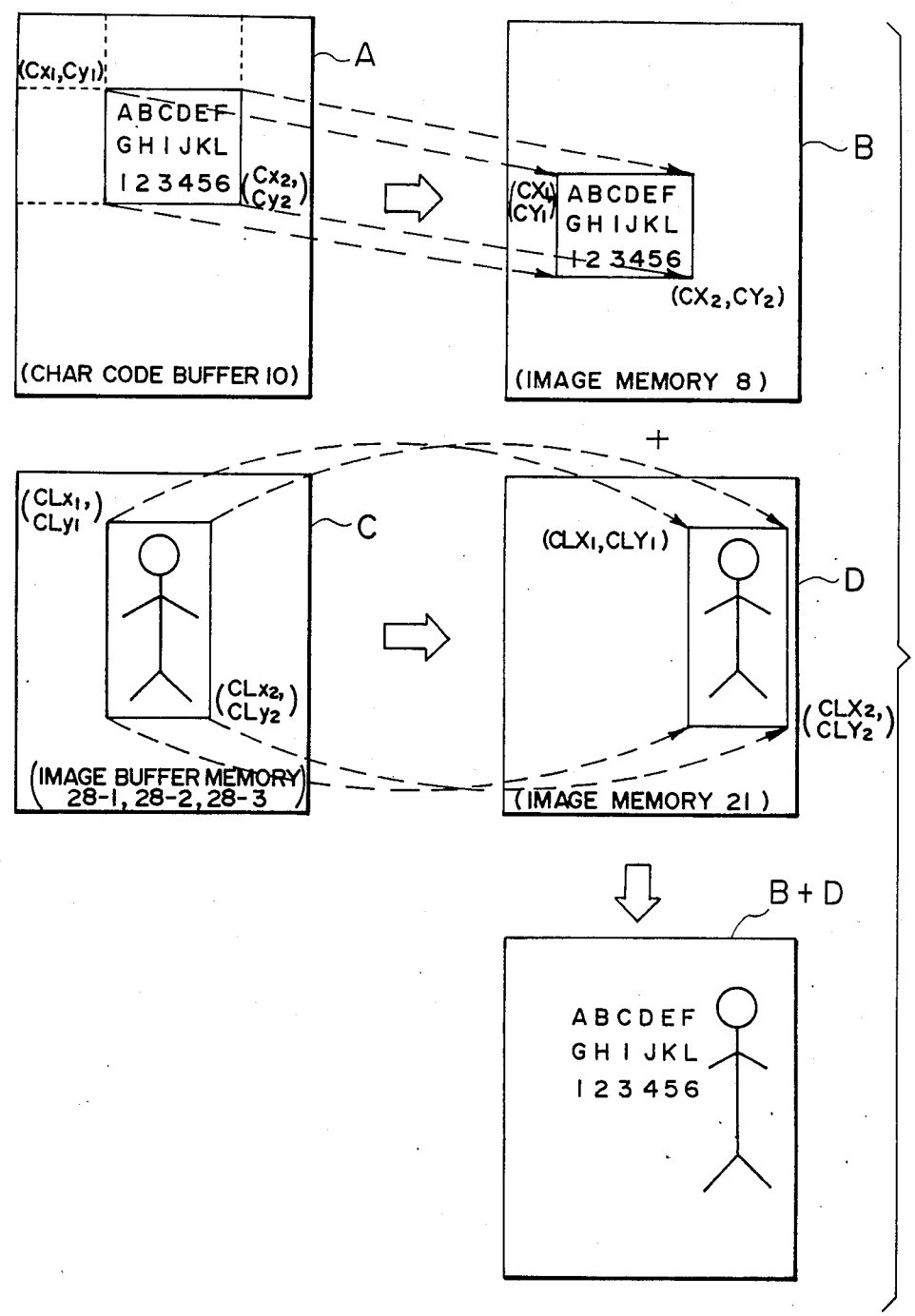
FIG. 8 shows representations wherein the character and half tone images, respectively, are independently moved to specified positions to obtain a composite image.

FIG. 8 shows a case wherein the designated regions of the character image and the half tone image, respectively, are independently moved to specific positions, and the character and half tone images are combined. Input images A and C are moved to specific positions, and resultant images B and D are combined to obtain a composite image (B+D).

Figure 3A:
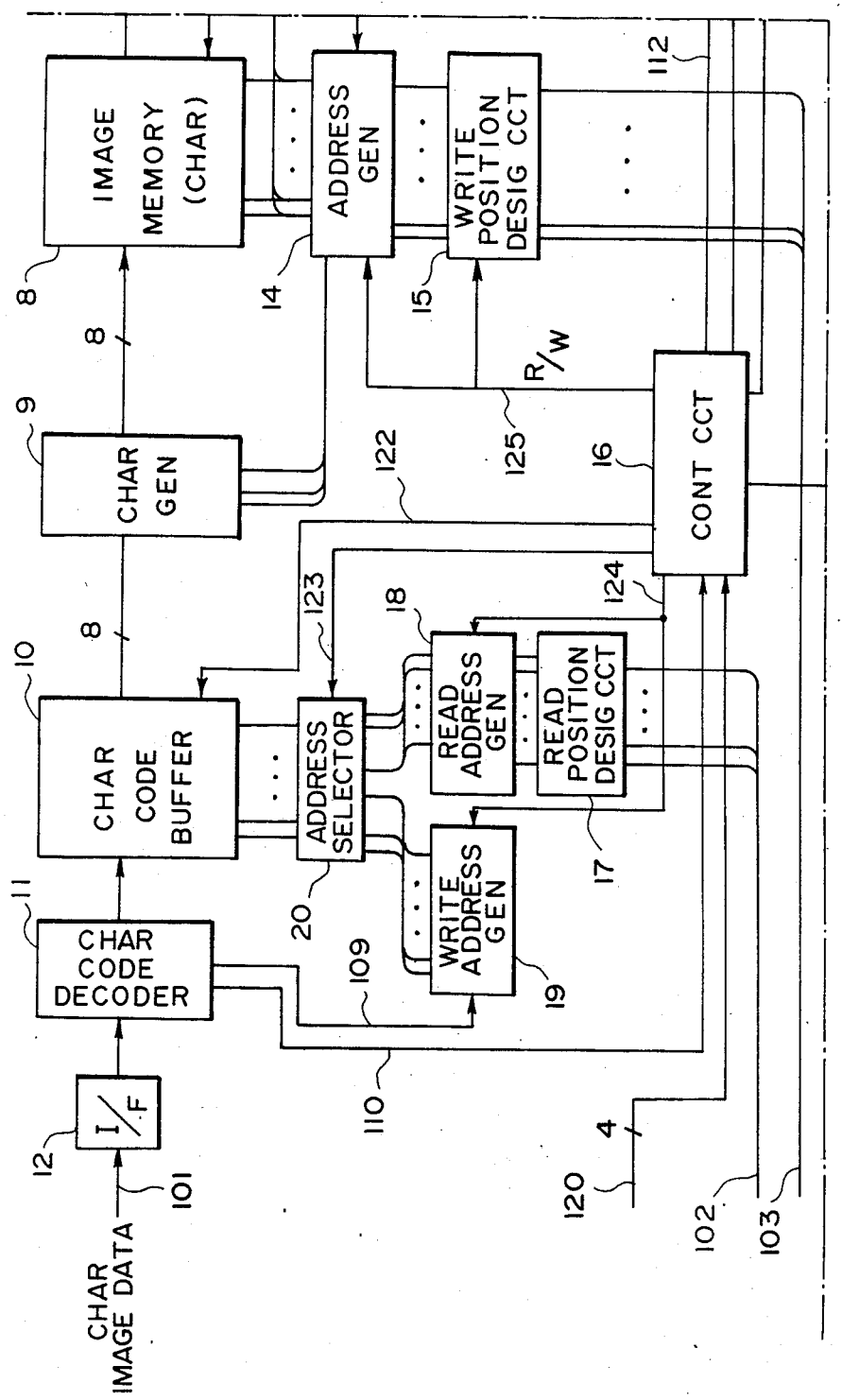
Figure 12A:
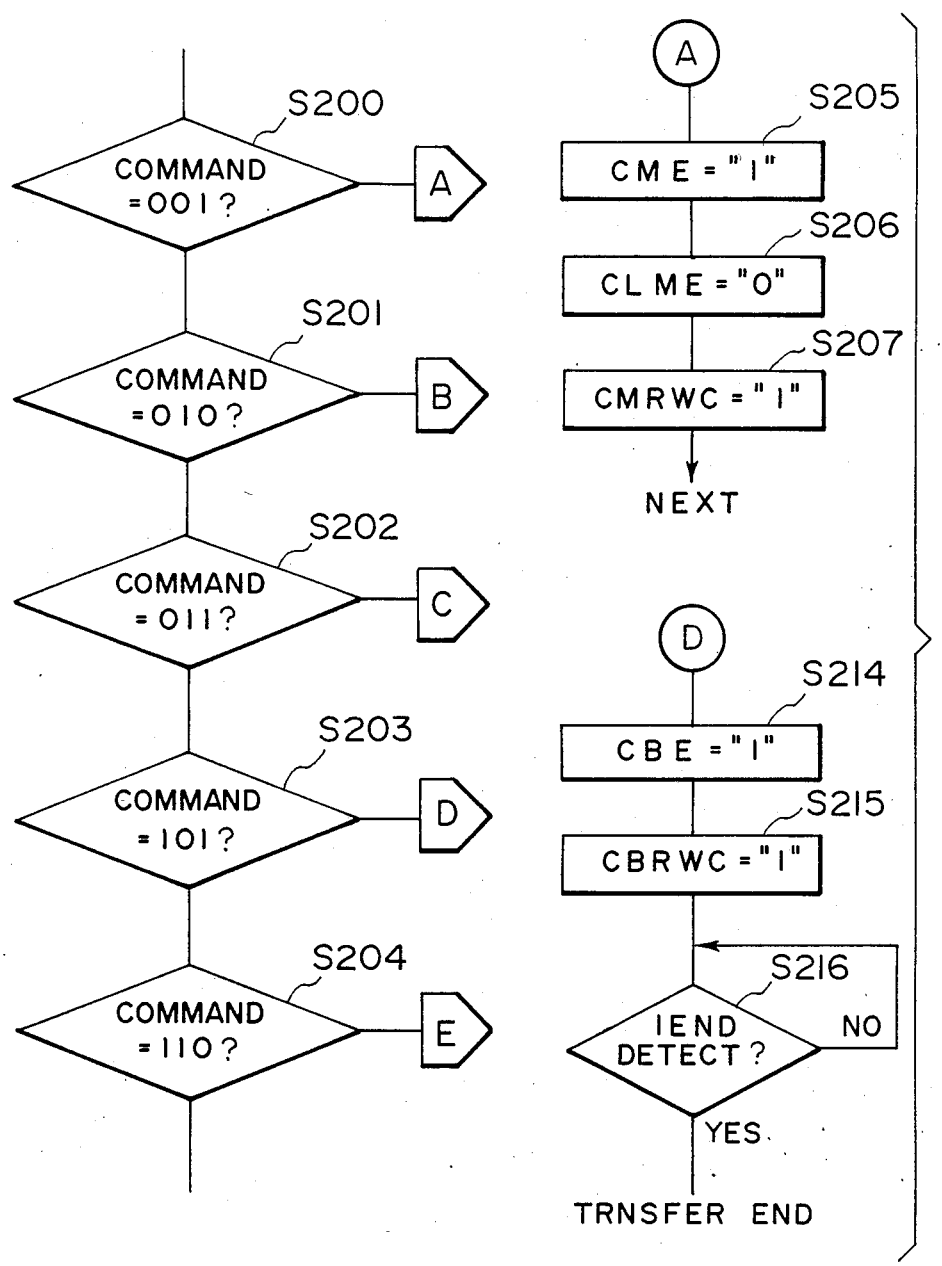
FIG. 12A and 12B are flow charts of a program stored in a ROM 41.
Figure 12B:
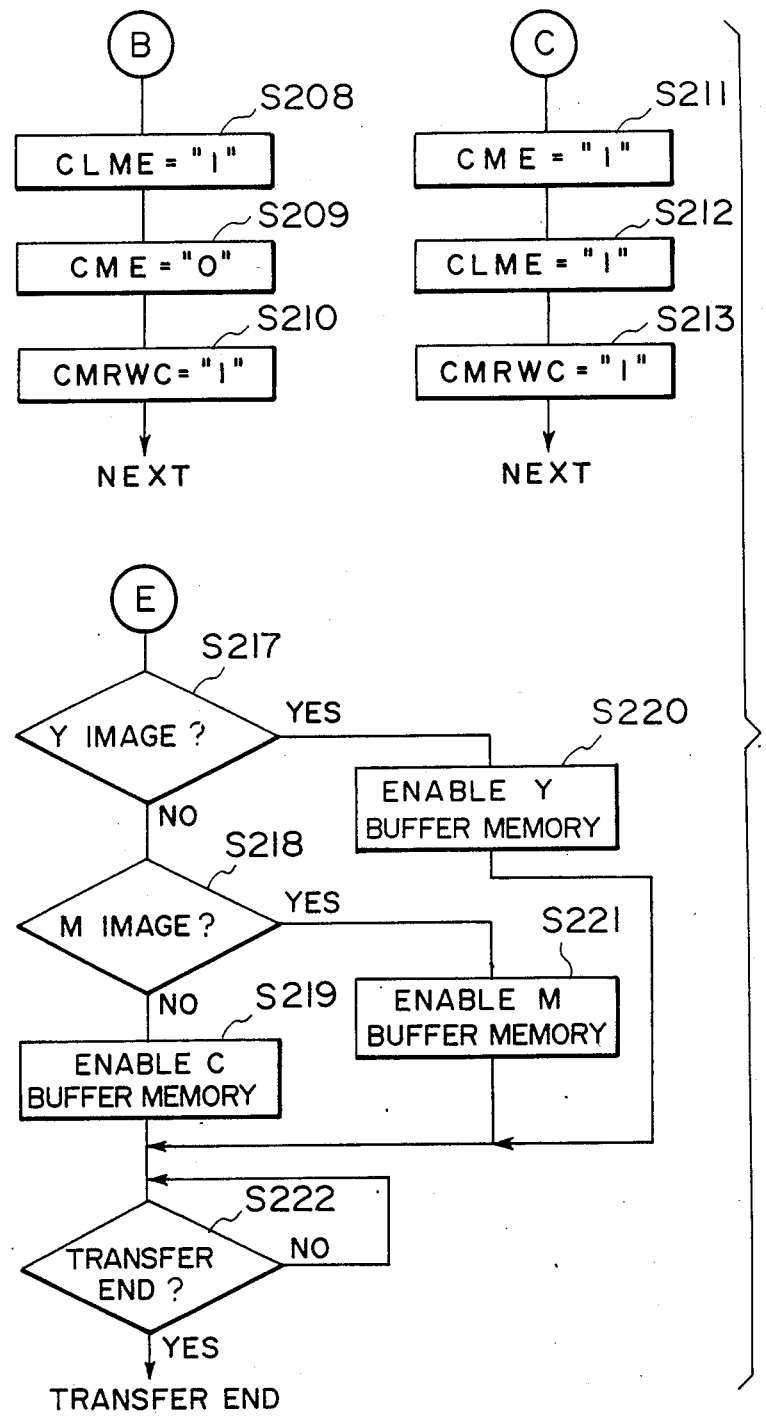

FIG. 9 is a detailed diagram of the control circuit 16 shown in FIG. 3A. The control circuit 16 mainly consists of two functional blocks represented by an I/O port 43 controlled by a CPU 40 such as a microcomputer and an address timing generator 44, respectively. A program ROM 41 of the CPU 40 stores a program. A data RAM 42 for the CPU 40 stores processed data. The I/O port 43 is connected to the following signal lines controlled by the CPU 40 and the program ROM 41. These signal lines consist of a signal line for sending a character buffer enable signal (to be referred to as a CBE hereinafter) 122 serving as a W/R enable signal of the character code buffer 10, a signal line for sending a character image memory enable signal (to be referred to as a CME hereinafter) 112 serving as a W/R enable signal of the character image memory 8, a signal line for sending a color image memory enable signal (to be referred to as a CLME hereinafter) 121 serving as a W/R enable signal of the half tone image memory 21, a signal line for sending a character buffer address select signal (to be referred to as a CBAS hereinafter) 123 serving as a W/R address switching signal of the character code buffer 10, a signal line for sending a character buffer R/W control signal (to be referred to as a CBRWC hereinafter) 124 serving as a W/R start signal of the character code buffer 10, a signal line for sending a character image memory R/W control signal (to be referred to as a CMRWC hereinafter) 125 as a W/R start signal of the character image memory 8, and a signal line for sending a color image memory write control signal (to be referred to as a CLMWC hereinafter) 126 serving as a write start signal for the half tone image memory 21. These signals are generated from the output port. It should be noted that the memories can be subjected to read/write access when the memory enable signal is set to be logic "1". The input port of the I/O port 43 receives the color designation signal 120 for designating the color of the character image to be printed, the one-page storage end signal 110 as the IEND signal, and a print control signal (command) 127 (not shown in FIGS. 3A through 3D), for controlling the printing format (e.g., only the character image, a composite image of the character image and the half tone image, the print start and the print end). The address timing generator 44 generates a character code read timing signal (to be referred to as a CCRT hereinafter) 129 (not shown in FIGS. 3A through 3D), a character dot write timing signal (to be referred to as a CDWT hereinafter) 130 (not shown in FIGS. 3A through 3D). The CCRT 129 serves as the count signal and the read timing signal for the address generation counter in the read address generator 18. The CDWT 130 serves as the count signal and the read/write timing signal of the address generation counter in the image memory address generator 14. The CCRT 129 and the CDWT 130 are supplied to the address generators 18 and 14, respectively. The CPU 40 in the control circuit 16 performs control operations such as image data transfer control (e.g., character code image and half tone color image data control), data storage control, and printout control in accordance with the data control commands supplied from the external equipment such as the host computer. The data control commands have character image or color image printout instructions and image data transfer start instructions from the external equipment, as shown in FIG. 10. The operation of the CPU 40 after the reception of the data control command will be described with reference to the flow chart of FIG. 12.

In steps S200 to S204, the data control commands (FIG. 10) are discriminated from each other. Routines A to E for the respective commands are then performed. If command=001 (step S200) is established, it represents the character print instruction, so that routine A is performed. The operation CME (character image memory enable) 112="1" (step S205) is performed to set the character image memory 8 in the R/W access enabled state. Subsequently, the operation CLME 121="0" is performed to set the color half tone image memory 21 to be disabled (step S206). The operation CMRWC 125="1" is performed to generate an address signal which is supplied to the character image memory 8 (step S207). The address generator 14 is used in the W/R access of the image memory 8. In this case, the memory is set in the memory read mode. The character image data are then read out by an image transfer clock (not shown) in synchronism with the image read sync signal 113. This readout image data is synchronized with the printer operation by the line buffer 6 and modulates the laser beam 4, thus contributing to image formation. However, when command=010 is discriminated in step S201, only the half tone image is read out, so that routine B is started.

In routine B, the operation CLME 121="1" is performed in step S208 to set the image memory 21 in the enable state. The operation CME 112="0" is performed in step S209 to set the image memory 8 in the disable state. The operation CMRWC ="1" is performed to generate an address signal which is supplied to the image memory 21. The address generator 14 is set in the memory read mode in the same manner as in routine A.

Furthermore, in the composite print out operation of the character image and the half tone image (i.e., command=011 in step S202, and routine C), the character image memory 8 and the color half tone image memory 21 are enabled to reproduce a composite image (steps S211 to S213). The image can be printed out with a single color Y, M, C or BK or a combination of these colors. The color designation is performed in response to the color designation signal 120 supplied from external equipment such as a host computer. Routine A or C is performed at the time of predetermined color printout (development) by means of a color printer, thereby obtaining a print with a desired color.

The image transfer start command will be described in detail. The external equipment such as a host computer must send any one of the character code transfer start command and the color image transfer start command to the color image recording device prior to transfer of the image data. When the character code is transferred, and command=101 is received by the color image recording apparatus, routine D which is branched from step 203 is started. In particular, the operations CBE (character buffer enable)="1" (step S214) and CBRWC (character buffer R/W control)="1" (step S215) are performed to supply the write address signals to the character code buffer 10, so that the character codes transferred from the external equipment such as the host computer in units of characters are sequentially stored in the character code buffer 10. In this case, the address selector 20 selects the write address in response to the CBAS (character buffer address select) signal supplied from the CPU 40. The end of transfer is detected such that the IEND code inserted at the end of one page of the image is detected by the character code decoder which supplies the character code transfer end signal 110 to the CPU 40, thereby signalling the end of character code data transfer to the CPU 40.

When the half tone image data is transferred, routine E branched from step S204 is started. In this routine, the CLBE (image buffer memory enable) signal 134 is supplied to and enables the image buffer memory 28-1, 28-2, or 28-3 of a color designated by the color discrimination signal 104 of the transferred color image (steps S217 to S221), so that the predetermined color image data are stored in the corresponding image buffer memories. In the write mode, the CPU 40 generates the address select signal (to be referred to as a CLBAS hereinafter) 132 (not shown in FIGS. 3A through 3D), to the corresponding image buffer memory which is to receive the write address. The CLBAS signal is also supplied to the address selector 30. The write address signal is supplied in synchronism with the vertical and horizontal synchronizing signals 106V and 106 H. When data of the predetermined number of lines (4752 lines in this embodiment) are stored, the write address generator 30 supplies the storage end signal CIEND 133 (not shown in FIGS. 3A through 3D) to the CPU 40.

The character codes are stored in the buffer memory 10, and the color half tone image data are respectively stored in the buffer memories 28-1, 28-2 and 28-3. The image data are subjected to predetermined processing, and the processed character and half tone data are transferred to the image memories 8 and 21, respectively.

The read access of the character code buffer 10 and the write access of the image memory 8 will be described. The character code is read out from the character code buffer 10 in response to the address signal generated from the write address generator 18. In this case, the read position designation circuit 17 designates which region of one-page image is to be printed out. For example, in representation A of FIG. 8, the read position designation circuit 17 designates the upper left address ($cx_1$, $cy_1$) and the lower right address ($cx_2$, $cy_2$), so that the addresses are generated to read out data from the region surrounded by the rectangle. These address signals are supplied to the character code buffer 10. Similarly, in the color image, the upper left address ($CLx_1$, $CLy_1$) and the lower right address ($CLx_2$, $CLy_2$) are read out in the state of representation C of FIG. 8 and are set in a read position designation circuit 33, so that the read addresses are generated to read out only data from the region shown in representation C of FIG. 8. Subsequently, the readout image data are stored in the image memories 8 and 21, and the position data representing positions (of a copying sheet) at which the readout image is printed must be set in the write position designation circuit 15 or 23. For example, in representation B of FIG. 8, the upper left address ($CX_1$, $CY_1$) and the lower right address ($CX_2$,$CY_2$) are set in the write position designation circuit 15, so that the readout character image is transferred to the position of presentation B of FIG. 8. In addition, the addresses ($CLX_1$, $CLY_1$) and ($CLX_2$, $CLY_2$) are set in the write position designation circuit 23, so that the read out color half tone image is transferred to the position of representation D of FIG. 8. Therefore, these transferred image data are combined to obtain a composite image having a layout illustrated in representation (B+D) of FIG. 8.

It should be noted that the addresses for designating the above-mentioned regions are supplied by the signals 102, 103, 107 and 108 from the external equipment.

FIG. 11 shows a data input section of the apparatus. In this apparatus, the image data (character image data and color half tone image data) 100 transferred from the external equipment such as the host computer is supplied to the apparatus through a single cable. The character image data must be separated from the color half tone image data (i.e., character code processing system and color half tone image processing system). The CPU 40 sends a data select (DS) signal 140 to a data selector 46 in response to the character code transfer start command or the color image transfer command which is supplied from the external equipment such as the host computer prior to image data transfer, thereby performing switching of data processing systems. Therefore, various types of data (e.g., image data compression code string, any other code, or command string) can be exchanged through a single data line by using the data discrimination signal (data control command shown in FIG. 11) and a switching circuit such as a data selector.

Figure 13:
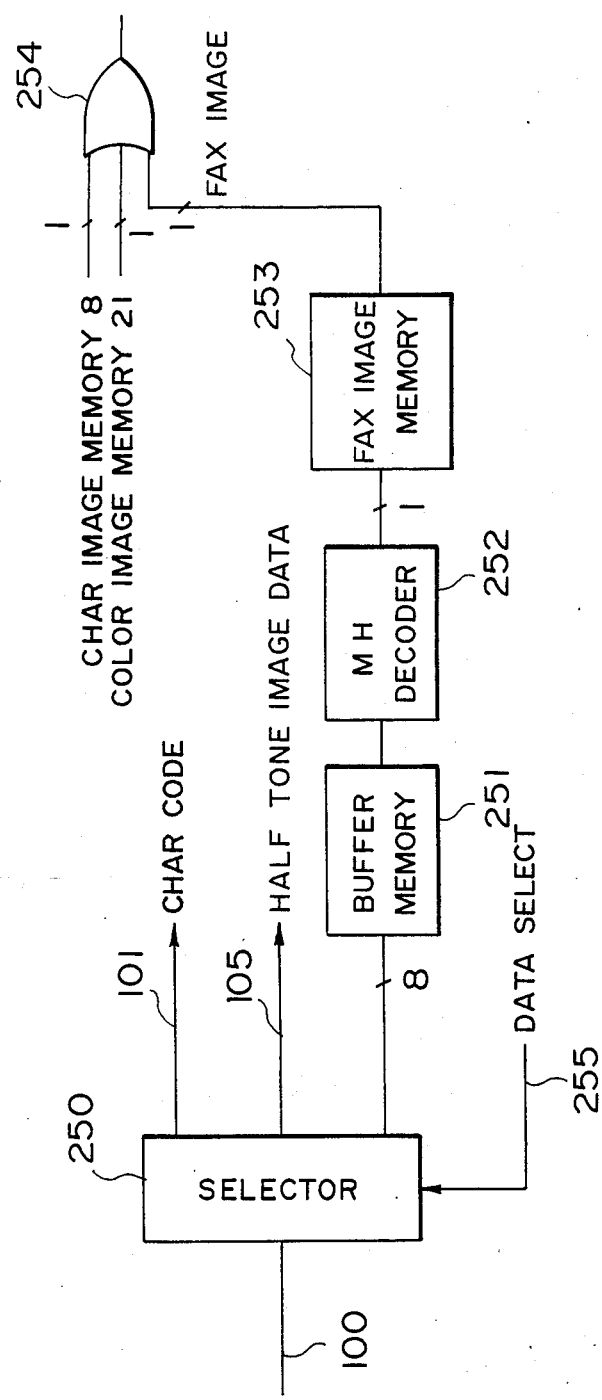
FIG. 13 is a block diagram of an image recording apparatus capable of receiving compression code data according to a second embodiment of the present invention.
Figure 14:
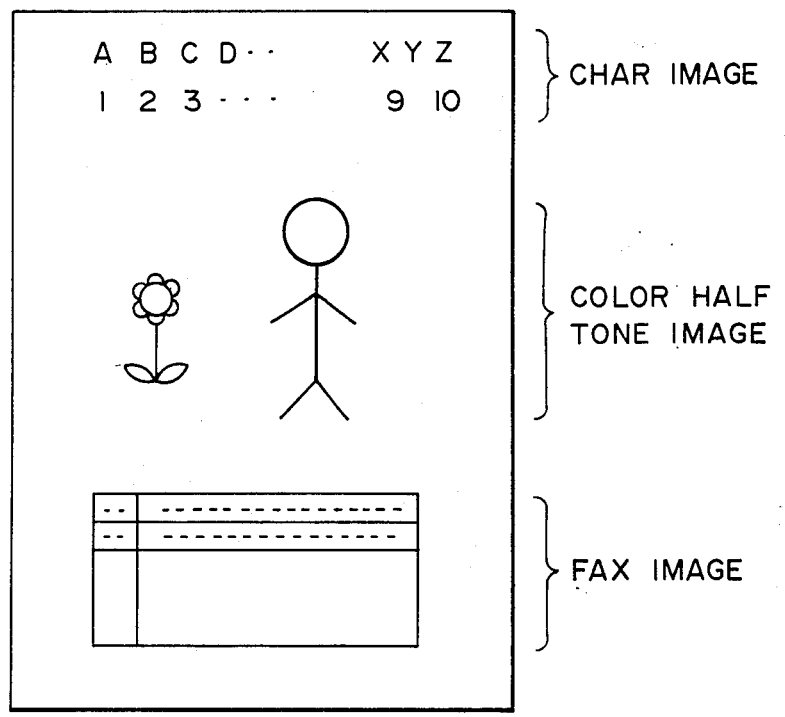
FIG. 14 is a representation showing a composite image consisting of a character image, a color half tone image and a a facsimile image.
Figure 15A:
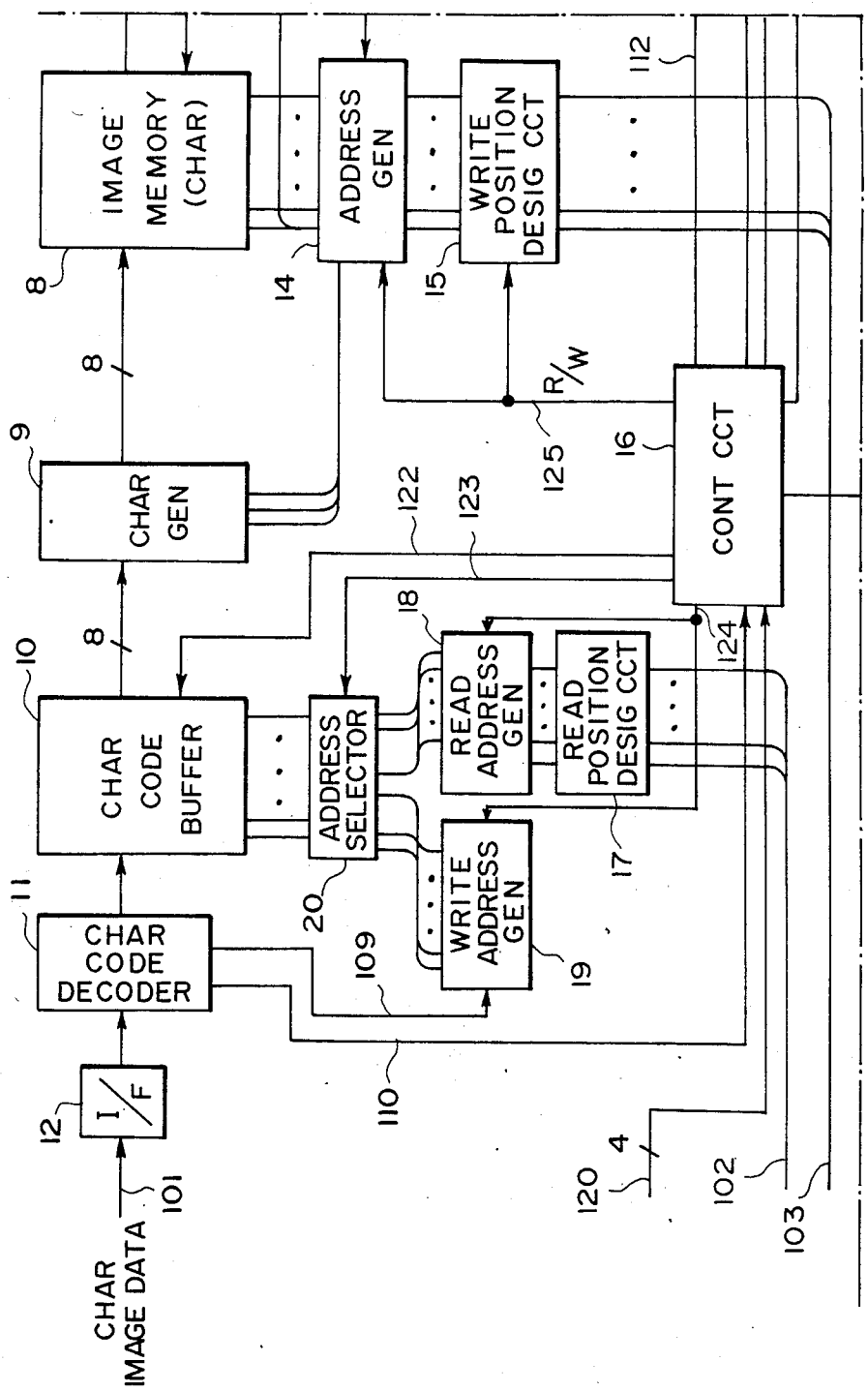
Figure 15B:
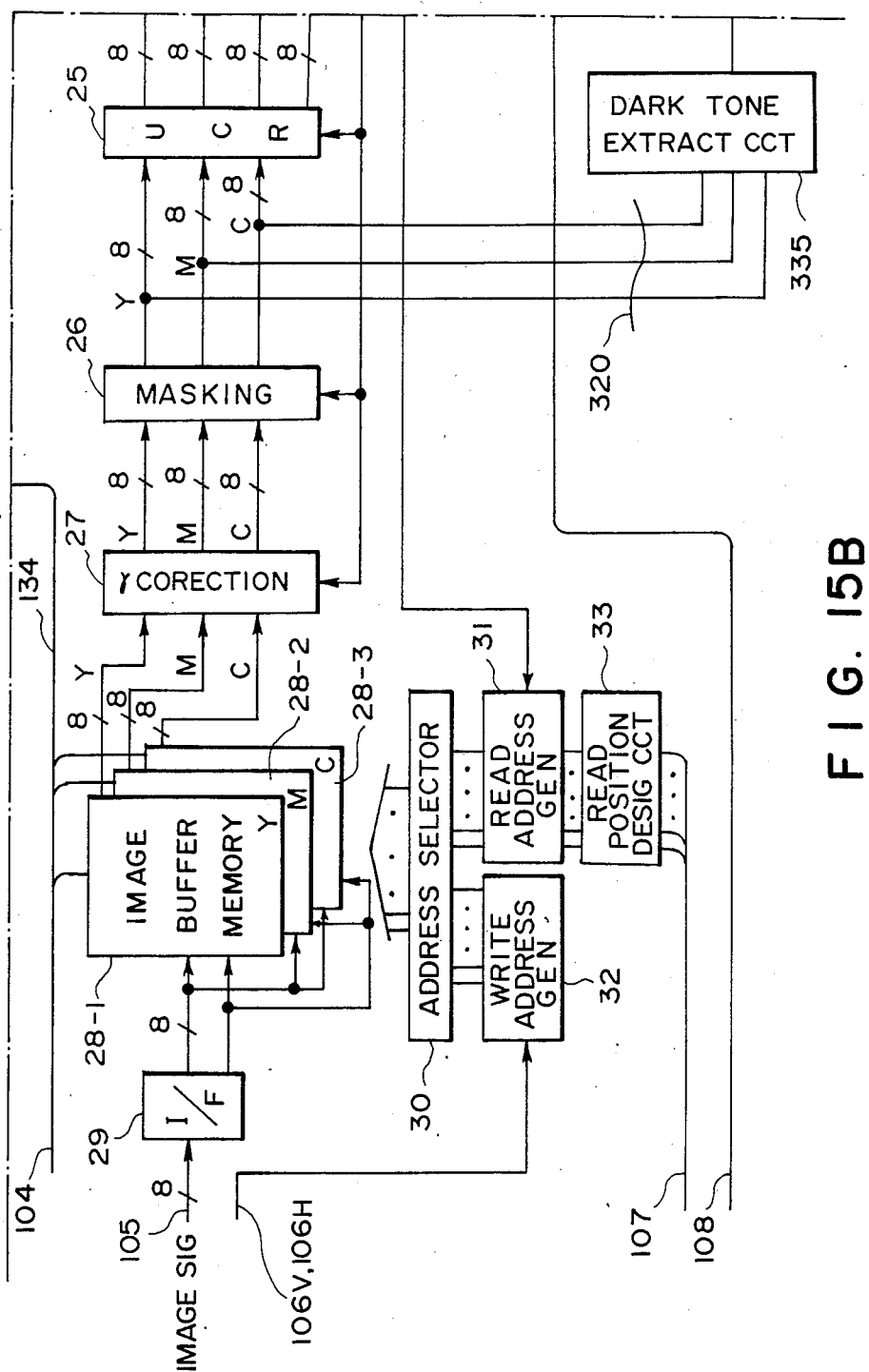

When the circuit arrangement shown in FIG. 13 is used, the apparatus can receive the facsimile compressed code to combine a facsimile image with the character image and the color half tone image. When a FAX code discrimination command is added to the commands shown in FIG. 10, the CPU 40 receives the FAX code discrimination command prior to transfer of the compression code. The CPU 40 then supplies a select signal (DS) 255 to a data selector 250 to select and receive a facsimile compressed code (e.g., MH code). The MH code is stored in a buffer memory 251 in the same manner as in storage of the character image data and the color half tone image data. When the MH code is stored, it is read out and is decoded by an MH decoder 252, thereby producing dot data. The dot data are then stored in a FAX image memory 253. In this case, a region is designated, and an image can be printed in the designated region in the same manner as previously described. Finally, the dot data are supplied to the printer through an OR gate 254. Therefore, the character image, the color half tone image and the facsimile image can be combined to obtain a composite image shown in FIG. 14.

It should be noted that the character code processing circuit and the half tone image data processing circuit are the same as those in FIGS. 3A through 3D and are omitted.

Figure 3B:
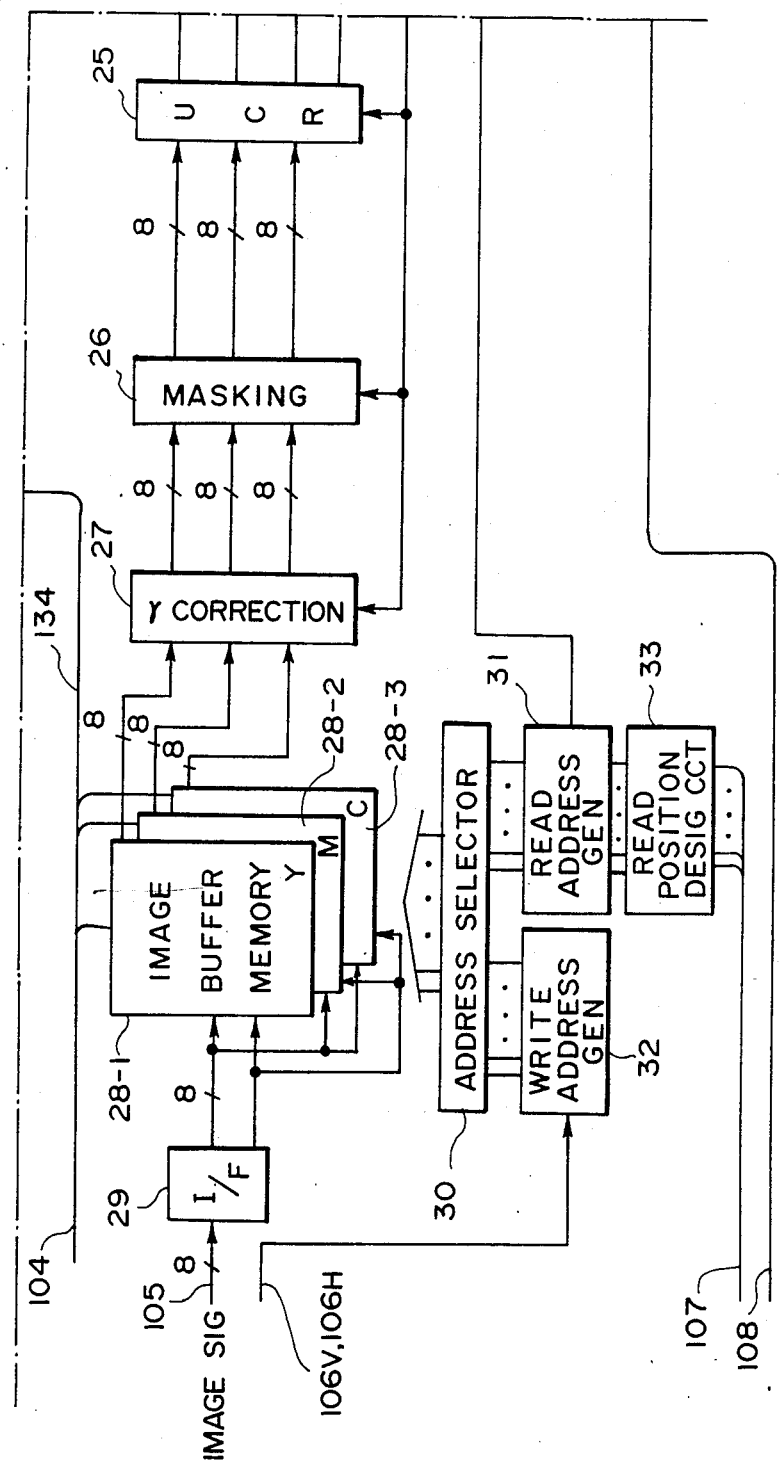
Figure 3C:
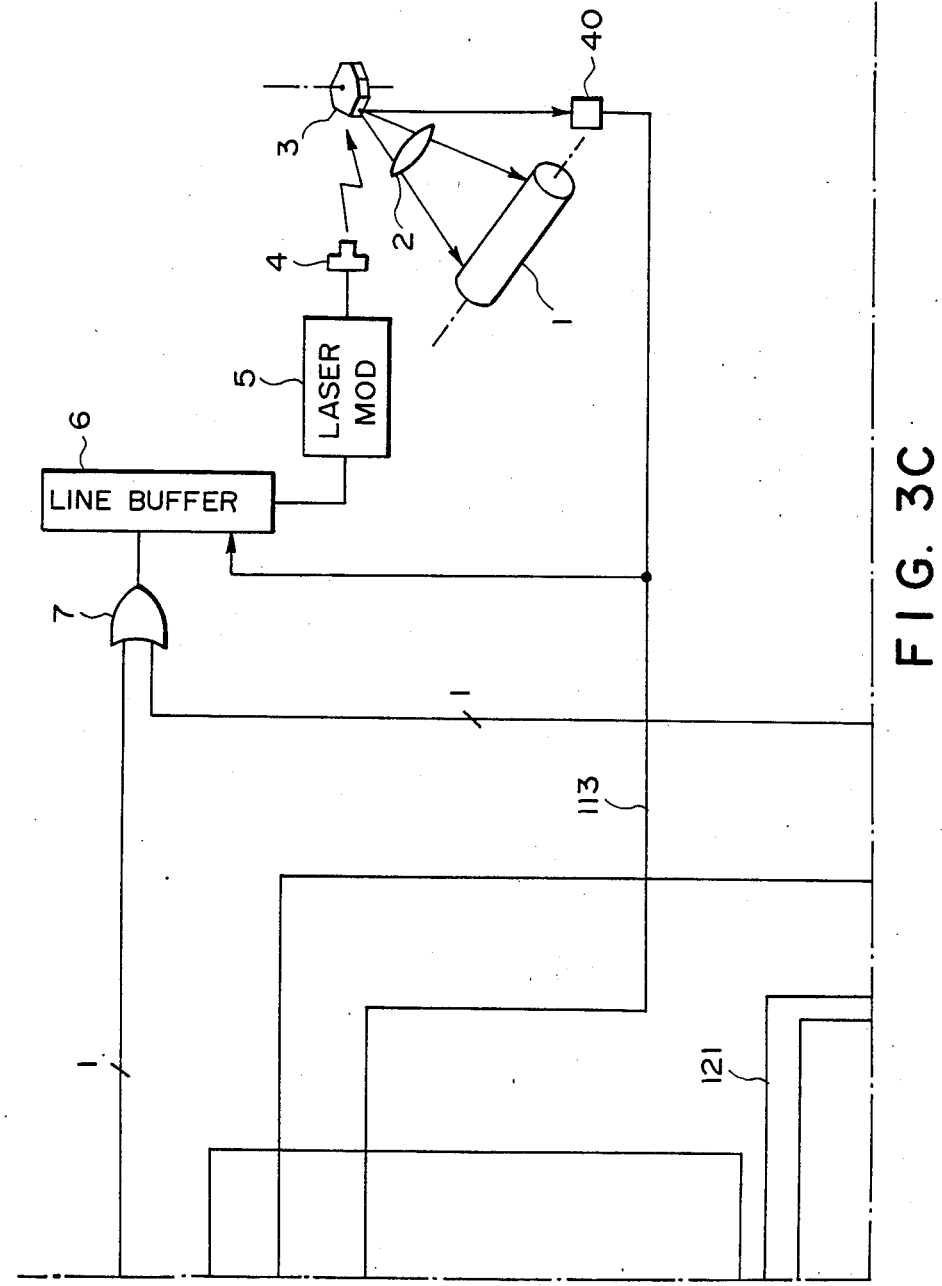
Figure 16:
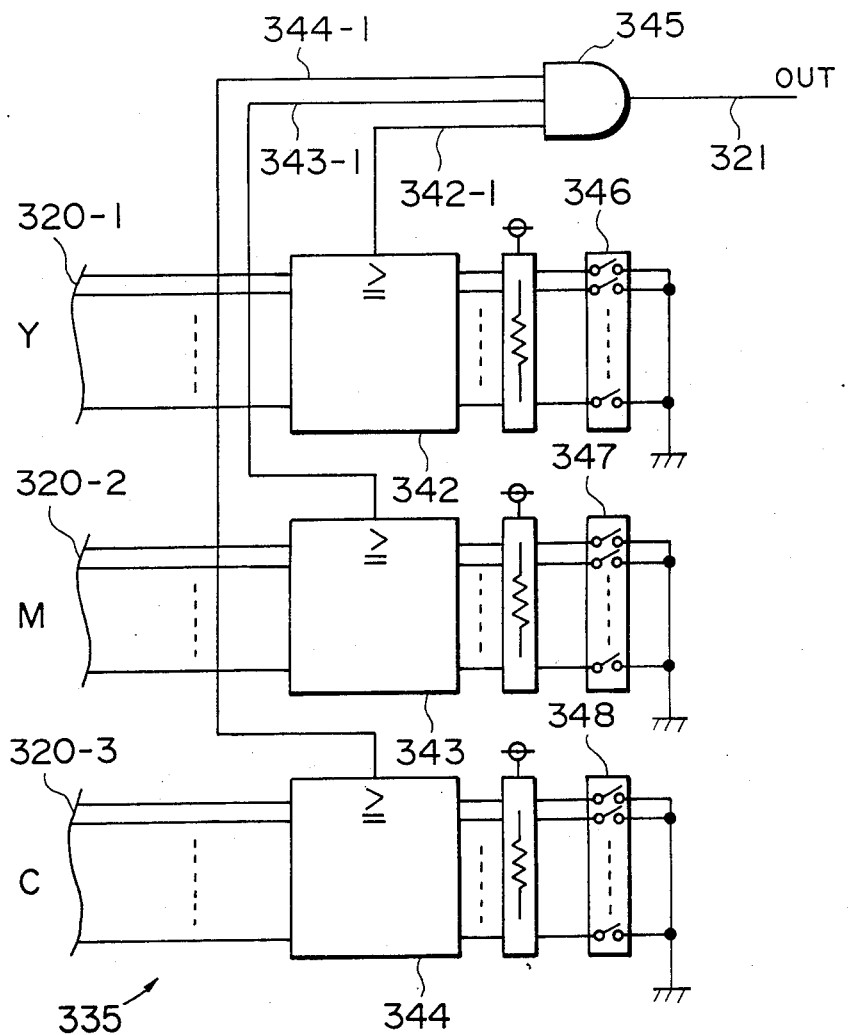
FIG. 16 is a detailed block diagram of a dark tone extraction circuit.

FIGS. 15A through 15D show a color image recording apparatus according to a third embodiment of the present invention. The same reference numerals used in FIGS. 3A through 3D denote the same parts in FIGS. 15A through 15B, and a detailed description thereof will be omitted. Therefore, the parts of the apparatus of FIGS. 15A through 15D which differ from those of FIGS. 3A through 3B are mainly described Referring to FIGS. 15A through 15D, a dark tone extraction circuit 335 extracts a dark tone portion, and a dark tone memory 336 stores the dark tone portion. As shown in FIG. 16, the dark tone extraction circuit 335 comprises comparators 342, 343 and 344, switches 346, 347 and 348, and so on. The switches 346, 347 and 348 serve to set the density components of Y (yellow), M (magenta) and C (cyan) to be discriminated as dark tones, respectively. The comparators 342, 343 and 344 compare the Y, M and C components of the input image density with preset values, respectively. When the input image density components exceed the preset values, respectively, data of logic "1" are produced for the corresponding pels. When all the input image densities of the Y, M and C components exceed the preset values, respectively, the comparators 342, 343 and 344 generate outputs 342-1, 343-1 and 344-1 of logic "1". This pel is regarded as the dark portion, so that data of "1" is stored in the dark tone memory 336 shown in FIG. 15D. In this case, the data can be stored in the dark tone memory in response to an address signal 118 which is generated from an address generator 22 and which is used to access the dark tone memory in the same manner as in storage of data in the half tone image memory 21. Therefore, the dark tone memory 336 has the same capacity as that of the image memory 21. In this embodiment, when the preset values of the switches 346, 347 and 348 of FIG. 16 change, the color to be regarded to be a dark tone can change. For example, when the preset values of the switches 346 and 347 are increased to correspond to a high density, and the preset value of the switch 348 is set to be zero, the Y and M components have high densities, and the C component has a low density, so that the "red" portion is regarded to be a dark tone which can be used as the background color.

In order to read out the data from a character image memory 8 and a half tone image memory 21 and send the data to a laser modulator 5, these data are stored as dot data in the image memories 8 and 21 and the dark tone memory 336 and are assigned with the identical address for the identical pel. In this embodiment, address access of the image memories 8 and 21 and the dark tone memory 336 is controlled by the image memory address generator 14. More particularly, when the image data are stored in the image memories 8 and 21, the read address is generated to read out dot data of the character image, thereby sending the half tone image and the dark tone portion which correspond to the identical pel.

The dot data of the character image and the half tone image which are respectively read out from the image memories 8 and 21 act exclusively to each other. In particular, in the character printout mode, when the character portion comprises print dots (115="1") and the background portion (i.e., the data corresponding to the identical pel which is read out from the dark tone memory) is set to be "1" (i.e., the background color is the dark tone), an output from an AND gate 337 is set to be logic "0", so that a hollow character is generated. However, when the background portion is set to be logic "0" (i.e., the the background portion is set to be white or a light color), an output from the AND gate 337 is set to be logic "1", so that a solid character is printed.

Figure 17:
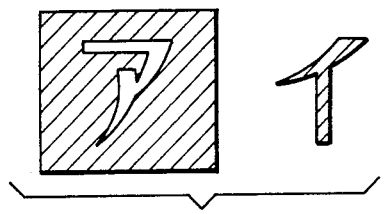
FIG. 17 is a representation showing an image obtained by the apparatus shown in FIG. 15.
Figure 18D:
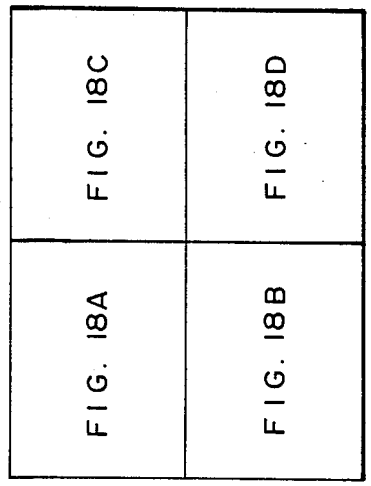
Figure 18D:
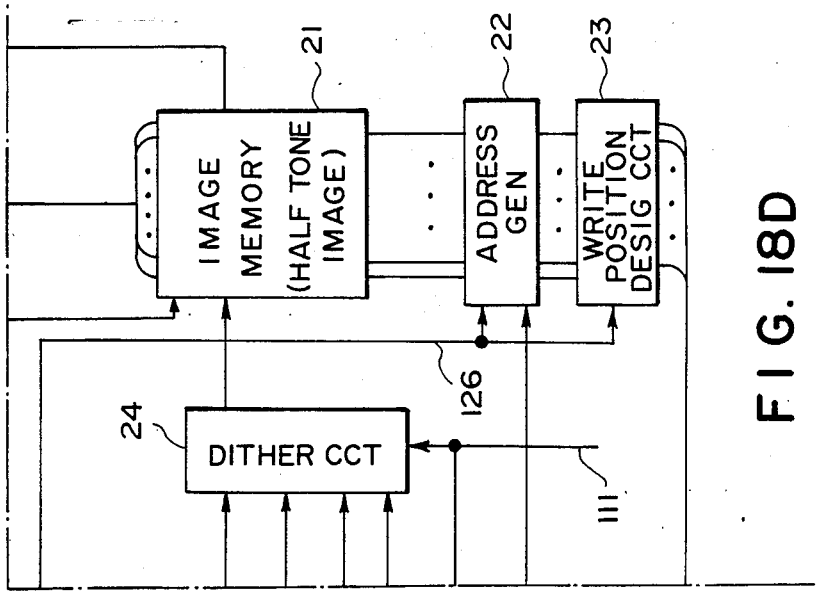
Figure 18B:
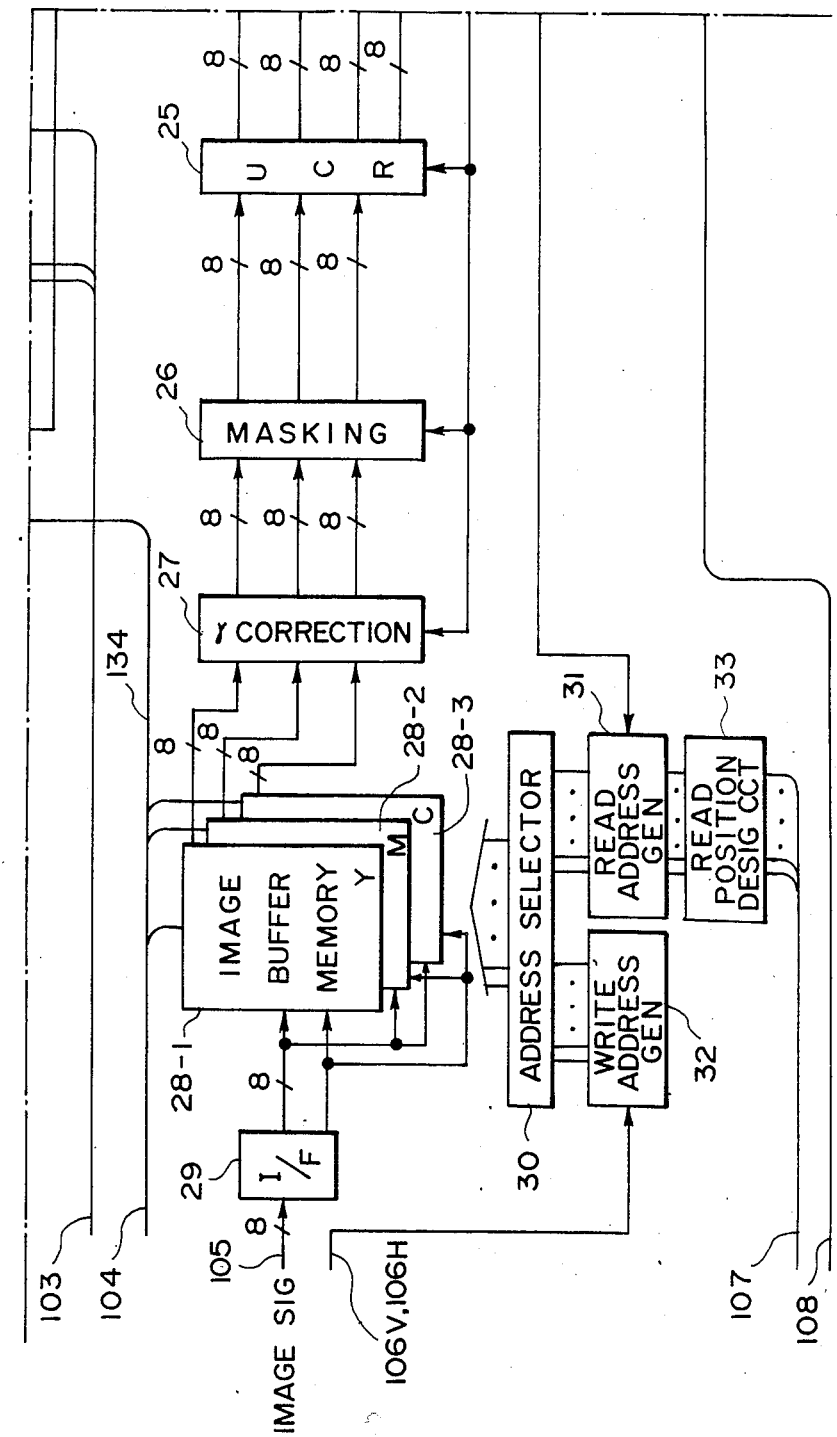
Figure 18C:
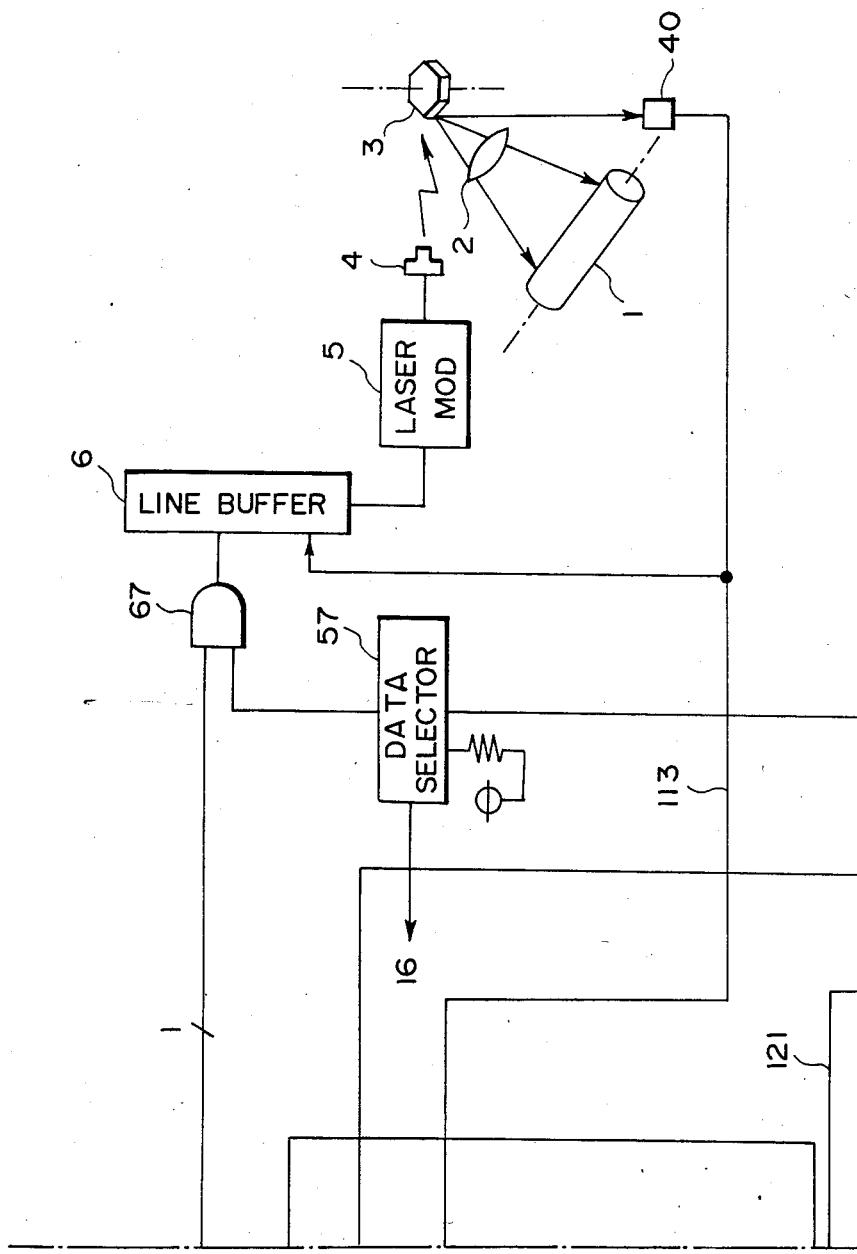

On the other hand, in the half tone image printout mode, when the character portion comprise print dots (i.e., the signal 115="1"), the output from an AND gate 338 is set to be logic "0" irrespective of the type of the image data 116, so that the character region is not superposed on the half tone image. In other words, the white portion is formed in the half tone image. Therefore, the half tone image data is generated when the character portion is not present (i.e., signal 115="0"). In this manner, the resultant images are as shown in FIG. 17. As is apparent from FIG. 17, the hollow character is generated in a dark background or black solid portion However, the solid character in black or any other color (to be described later) is generated when the background portion is white. A character image/half tone image selector 339 is controlled in accordance with a signal 114 from the control circuit 116 such that an input terminal A is coupled to an output terminal C when the character image is generated and that an input terminal B is coupled to the output terminal C when the half tone image is generated. An OR gate may be used in place of the selector 339. When the OR gate is used, the character image and the half tone image can be simultaneously produced, thereby decreasing the number of transfer operations.

In the color image recording apparatus of this embodiment, the yellow image is read out to operate a yellow developing unit (not shown) so as to form a yellow image on the photosensitive drum. The yellow image is transferred to a transfer sheet wound around the transfer drum, so that one-color transfer can be completed. Subsequently, magenta, cyan and black images are formed to obtain a four-color image. Thereafter, the selector 339 is switched to obtain a character image with a desired color.

The signal 112 serves to control the color of the character image, as previously described. The character data is read out from the image memory 8 and is printed with a desired color in response to the signal 112. Similarly, the image with a desired color may be controlled to be read out while the half tone image is read out from the image memory 21, thereby obtaining a single color or a mixed color image.

In the same manner as described above, when the yellow character is printed out, only the switch 346 of FIG. 16 is controlled such that the value is set to be a high density, while the switches 347 and 348 are controlled such that the values are set to be a high density.

The yellow portion of the half tone image is regarded as the background, so that the yellow character can be clearly distinguished from the half tone image. Even if the yellow half tone image portion overlaps the yellow character, the yellow character portion is produced as a hollow character which can be clearly recognized.

FIGS. 18A to 18D show a color image recording apparatus according to a fourth embodiment of the present invention. The same reference numerals used in FIGS. 18A to 18D denote the same parts or functions in FIGS. 3A to 3D, and a detailed description thereof will be omitted. Only the parts of the apparatus (FIGS. 18A to 18D) which differ from those of the apparatus (FIGS. 3A to 3D) are mainly described.

Figure 19A:
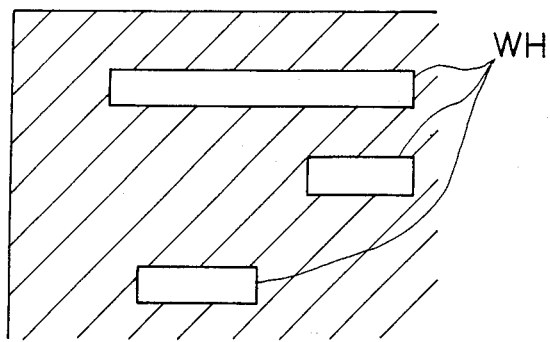
FIGS. 19A, 19B, and 19C respectively are representations for explaining an image with white portions in a solid image portion.
Figure 19B:
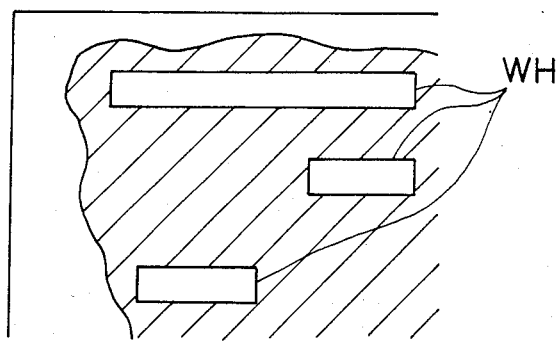
Figure 19C:
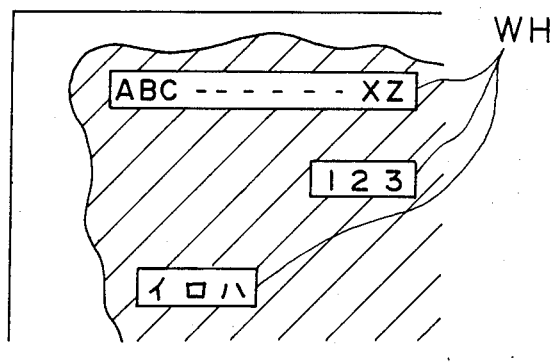

Referring to FIGS. 18A to 18D, a blank code generator 55 generates a blank code to form a blank or white portion of a half tone image which is printed with characters. When the half tone image having blank portions is generated, the blank code generator 55 generates the blank code to a character generator 9 through a selector 56, so that blank portions are formed at positions where the character data read out from an image memory 8 is printed. Data of portions excluding the blank portions are set to be logic "1" in accordance with an input 215 to an OR gate 54. As shown in FIGS. 19A, the half tone image has the blank or white portions. A half tone image output data selector 57 couples the input of an AND gate 67 and the output of the image memory 21. Therefore, the final image data read out from the AND gate 67 is a half tone image or solid image having white or blank portions WH of FIG. 19A. or FIG. 19B. When the characters are then generated, the selector 56 is operated such that a character code buffer 10 is coupled to the character generator 9. The character generator converts the character codes to the dot data which are then stored in the character image memory 8. In this case, since the input 215 to the OR gate 54 is set to be logic "0", only the character dot data are stored in the character image memory 8. The data selector 57 is connected such that the input to the AND gate 67 is set to be logic "1". Therefore, only the character dot data read out from the character image memory 8 are gated through the AND gate 67. As a result, an image shown in FIG. 19C is obtained as the final image wherein the predetermined characters are printed in the white or blank portions WH of the image shown in FIG. 19B.

The blank code generator 55 performs the following operation when the image shown in FIG. 19A is stored in the image memory 8. The character codes are sequentially supplied from the character code buffer 10 to the blank code generator 55 (signal lines for the character codes are not illustrated). The blank code generator 55 generates the blank codes to the portion excluding the blank portions. The blank code generator 55 supplies a signal (not shown) to the control circuit 16 so as to write data of "1" for the nonblank portion in response to an input 215. When the control circuit 16 receives the signal from the blank code generator 55, the circuit 16 causes the address generator 14 to generate data of logic "1".

In this manner, the image shown in FIG. 19A is stored in the image memory 8. It should be noted that the character code buffer does not have control codes and stores only the character codes.

It is also noted that the image produced by the data read out from the memories 8 and 21 can be temporarily displayed on the CRT display to check the position and color of characters to be superposed on the half tone image. Thereafter, printing can be performed.

In the color image recording apparatus, the yellow image, the magenta image, the cyan image, the black image, and the character image are sequentially formed on the photosensitive drum 1 and are superposed on the transfer sheet, thereby obtaining a full-color image.

It should be noted that the color of the character image can be easily determined by selectively using the developers when the character image is printed out (developed).

When the various types of codes having different blank sizes can be generated from the blank code generator, and the blank patterns corresponding to the blank sizes are generated from the character generator, thereby obtaining white or blank portions having different sizes.

In the above embodiment, the character patterns are stored in the corresponding image memory. However, any other line image pattern may be stored in the character image memory. In addition, this embodiment employs the laser beam printer as an output device. However, the present invention is not limited to the laser beam printer but may be extended to an ink jet printer or a thermal transfer printer.

A disk instead of the output device may be used to file the resultant composite image.

The character data and the position designation signal are supplied from the external equipment in the above embodiment. However, these signals may be entered with data input keys arranged in the color image recording apparatus.

The R, G and B color image data can be supplied from a CCD scanner or the like. In addition to this modification, the composite image can be stored in memories (Y, M, C and BK memories) in units of colors.

The present invention is not limited to the particular embodiment described above, and various changes and modifications may be made within the spirit and scope of the present invention.

I claim

1. An image processing apparatus comprising:
    image signal input means for entering an image signal;
    character code signal input means for entering a character code signal;
    means for half-tone processing the image signal to produce a digital half-tone image signal, said half-tone processing means including means for storing the image signal entered by said image signal input means;
    converting means for converting the character code signal into a digital character image signal, said converting means including means for storing the character code signal entered by said character code input means;
    digital character image signal storing means for storing the digital character image signal converted by said converting means; and
    common image forming means for receiving the digital half-tone image signal and the digital character image signal;
    wherein said common image forming means provides a sync signal that is synchronized with an image forming operation, and the digital character image signal stored in said digital character image signal storing means is read out in response to the sync signal and transmitted to said common image forming means.

2. An apparatus according to claim 1, wherein said half-tone processing means includes means for storing the digital half-tone image signal.

3. An apparatus according to claim 2, further comprising means for designating output regions and output positions at which an image represented by the digital half-tone image signal is to be formed by said common image forming means.

4. An apparatus according to claim 1, further comprising color designating means for reproducing a character represented by the character code signal in a predetermined color.

5. An apparatus according to claim 1, wherein said half-tone processing means includes dither conversion means for dither converting the image signal entered by said image signal input means into a binary image signal.

6. An image processing apparatus comprising:
image signal input means for entering an image signal;
character code signal input means for entering a character code signal;
means for color processing the image signal, entered by said image signal input means, to produce a digital color image signal, said color processing means including means for storing the image signal;
converting means for converting the character code signal, entered by said character code input means, into a digital character image signal, said converting means including means for storing the character code signal;
digital character image signal storing means for storing the digital character image signal converted by said converting means; and
common image forming means for receiving the digital color image signal and the digital character image signal;
wherein said common image forming means provides a sync signal that is synchronized with an image forming operation, and the digital character image signal stored in said digital character image signal storing means is read out in response to the sync signal and transmitted to said common image forming means.

7. An apparatus according to claim 6, further comprising means for combining the digital color image signal with the digital character image signal and sending the combined image signal to said common image forming means.

8. An apparatus according to claim 6, wherein said color processing means includes means for storing the digital color image signal.

9. An apparatus according to claim 8, further comprising means for designating output regions and output positions at which an image represented by the digital color image signal is to be formed by said common image forming means.

10. An apparatus according to claim 6, wherein said color processing means includes dither conversion means for dither converting the image signal, entered by said image signal input means, into a binary image signal.

11. An image processing apparatus comprising:
image signal input means for entering an image signal;
character code signal input means for entering a character code signal;
means for processing the image signal, entered by said image signal input means, to produce a digital image signal, said processing means including means for storing the image signal;
means for reproducing a character represented by the character code signal, entered by said character code signal input means, in a predetermined color;
converting means for converting the character code signal into a digital character image signal, said converting means including means for storing the character code signal;
digital character image signal storing means for storing the digital character image signal converted by said converting means; and
common image forming means for receiving the digital image signal and the digital character image signal;
wherein said common image forming means provides a sync signal that is synchronized with an image forming operation, and the digital character image signal stored in said digital character image signal storing means is read out in response to the sync signal and transmitted to said common image forming means.

12. An image processing apparatus comprising:
image signal input means for entering an image signal;
character code signal input means for entering a character code signal;
means for color processing the image signal, entered by said image signal input means, to produce a digital color image signal;
converting means for converting the character code signal, entered by said character code signal input means, into a digital character image signal;
means for reproducing a character represented by the character code signal in a predetermined color;
digital character image signal storing means for storing the digital character image signal converted by said converting means; and
common image forming means for receiving the digital color image signal and the digital character image signal;
wherein said common image forming means provides a sync signal that is synchronized with an image forming operation, and the digital character image signal stored in said digital character image signal storing means is read out in response to the sync signal and transmitted to said common image forming means.

13. An image processing apparatus comprising:
first image signal input means for entering a first image signal representing a background image;
second image signal input means for entering a second image signal representing a second image;
means for combining the first image signal, entered by said first image signal input means, with the second image signal, entered by said second image signal input means, in overlayed relation; and
means for modifying the second image signal in accordance with the background image overlayed on the second image represented by the second image signal.

14. An apparatus according to claim 13, wherein said modifying means modifies the second image signal in accordance with a level of the first image signal when the second image represented by the second image signal is overlayed on a background image represented by the first image signal.

15. An apparatus according to claim 14, wherein said modifying means has discriminating means for discriminating whether the level of the first image signal exceeds a predetermined value, said discriminating means including means for arbitrarily setting the predetermined value.

16. An apparatus according to claim 13, further comprising first memory means for storing the first image signal and second memory means for storing a character signal, wherein the second image signal is the character signal.

17. An apparatus according to claim 16, further comprising means for designating output regions and output positions of the first image signal.

18. An apparatus according to claim 16, further comprising color designating means for reproducing a character represented by the character signal in a predetermined color.

19. An apparatus according to claim 13, further comprising character code signal input means for entering a character code signal and converting means for converting the character code signal into a digital character image signal, wherein the second image signal is the digital character image signal.

20. An apparatus according to claim 13, further comprising density image signal input means for entering a density image signal and dither conversion means for dither converting the density image signal into the first image signal.

21. An image processing apparatus comprising:
first image signal input means for entering a first image signal representing a first image;
second image signal input means for entering a second image signal representing a second image;
means for combining the first image signal with the second image signal, said combining means including means for modifying the first image signal to convert a region of the second image represented by the second image signal into a predetermined condition appropriate for combination with the first image represented by the first image signal.

22. An apparatus according to claim 21, wherein said modifying means modifies the first image signal when the image represented by the second image signal is overlayed on an image represented by the first image signal.

23. An apparatus according to claim 21, further comprising first memory means for storing the first image signal and second memory means for storing a character signal, and wherein the second image signal is a character signal.

24. An apparatus according to claim 23, further comprising means for designating output regions and output positions of the first image signal.

25. An apparatus according to claim 23, further comprising color designating means for reproducing a character represented by the character signal in a predetermined color.

26. An apparatus according to claim 21, further comprising character code signal input means for entering a character code signal and converting means for converting the character code signal into a digital character image signal, and wherein the second image signal is the digital character image signal.

27. An apparatus according to claim 21, further comprising density image signal input means for entering a density image signal and dither conversion means for dither converting the density image signal into the first image signal.

28. An image processing apparatus comprising:
input means for entering first and second types of image data to be combined and identification data identifying the first and second types of data respectively;
separating means for separating the first and second types of the image data entered from said input means, said separating means separating the image data in accordance with the identification data identifying the respective types of the image data;
first processing means for processing the first type of the image data separated by said separating means;
second processing means for processing the second type of the image data separated by said separating means; said second processing means including half-tone processing means for half-tone processing the second type of the image data; and
means for combining the image data processed by said first processing means with the image data processed by said second processing means.

29. An apparatus according to claim 28, wherein said first processing means produces a character dot signal and wherein said second processing means produces a dot image signal, and said combining means combines the character dot signal with the dot image signal.

30. An apparatus according to claim 28, wherein the first type of the image data is a character code signal, and said first processing means includes means for converting the character code signal into a digital character image signal.

31. An image processing apparatus comprising: input means for entering first and second types of image data to be combined, respectively representing first and second images, and identification data identifying the first and second types of data respectively;
means for separating the first and second types of image data entered from said input means, said separating means separating the image data in accordance with the identification data representing the respective types of the image data;
first processing means for processing the first type of image data separated by said separating means;
second processing means for processing the second type of the image data separated by said separating means; and
combination means for combining the first type of image data processed by said first processing means with the second type of image data processed by said second processing means, said combining means including means for selecting a position for combination of an image represented by the first type of the image data with an image represented by the second type of the image data.

32. An apparatus according to claim 31, wherein the first type of image data is a character code signal, and said first processing means includes means for converting the character code signal into a digital character image signal.

33. An image processing apparatus comprising:
input means for entering first and second types of image data to be combined and identification data for identifying the first and second types respectively;
separating means for separating the first and second types of image data entered from said input means, said separating means separating the image data in accordance with the identification data representing the respective types of the image data;
first processing means for processing the first type of the image data separated by said separating means;

second processing means for processing the second type of the image data separated by said separating means, said second processing means including color processing means for color processing the second type of the image data; and means for combining the image data processed by said first processing means with the image data processed by said second processing means.

34. An image processing apparatus comprising:

image signal input means for entering a dot image signal;

character signal input means for entering a dot character signal;

first storing means for storing the dot image signal entered by said image signal input means;

second storing means for storing the dot character signal entered by said character signal input means;

common image forming means for receiving the dot image signal from said first storing means and the dot character signal from said second storing means;

means for allowing said common image forming means to receive the dot image signal and the dot character signal wherein said common image forming means provides a sync signal that is synchronized with an image forming operation and the dot character signal stored in said second storing means is read out in response to the sync signal and transmitted to said common image forming means.

35. An image processing apparatus comprising:

first image signal input means for entering a noncompressed image signal;

second image signal input means for entering a compressed image signal;

first processing the noncompressed image signal entered by said first image signal input means;

second processing means for processing the compressed image signal entered by said second image signal input means, said second processing means including means for decoding the compressed image signal;

common image forming means for receiving and combining the respective image signals from said first and second processing means; and means for allowing said common image forming means to receive and combine the respective image signals from said first and second processing means.

* * * * *

UNITED STATES PATENT AND TRADEMARK OFFICE
CERTIFICATE OF CORRECTION

PATENT NO. : 4,682,190

DATED : July 21, 1987

INVENTOR(S) : Yoshinori Ikeda

Page 1 of 6

It is certified that error appears in the above-identified patent and that said Letters Patent is hereby corrected as shown below:

Title page:

IN THE ABSTRACT AT [57]

Line 5, "response a" should read --response to a--.
  Lines 11 (both occurrences), 14 and 15, "half tone" should read --halftone--.

IN FIG. 12A

"TRNSFER END" should read --TRANSFER END--.

COLUMN 1

Lines 11, 17, 18, 20, 22, 32, 40, 41, "half tone" should read --halftone--.

COLUMN 2

Line 6, "half" should read --half- --.
  Lines 8, 11, 23, 24, 29, 34, 39, "half tone" should read --halftone--.
  Line 43, "half" should read --half- --.
  Lines 48, 55, 58, 60, 63, "half tone" should read --halftone--.

COLUMN 3

Line 2, "half" should read --half- --.
  Lines 9, 20, 46, "half tone" should read --halftone--.
  Line 53, "FIG. 12A" should read --FIGS. 12A--.
  Line 60, "half tone" should read --halftone--.
  Line 61, Delete "a" (second occurrence).

UNITED STATES PATENT AND TRADEMARK OFFICE
CERTIFICATE OF CORRECTION

PATENT NO. : 4,682,190

DATED : July 21, 1987

INVENTOR(S) : Yoshinori Ikeda

It is certified that error appears in the above-identified patent and that said Letters Patent is hereby corrected as shown below:

COLUMN 4

Line 4, "form block" should read --form a block--.
    Line 32, "half tone" should read --halftone--.

COLUMN 5

Line 26, "frdm" should read --from--.
    Lines 31, 33, and 51, "half tone" should read --halftone--.

COLUMN 6

Line 2, "half tone" should read --halftone--.
    Line 38, "magehta" should read --magenta--.
    Lines 50 and 59, "half tone" should read --halftone--.
    Line 62, Delete "a"

COLUMN 7

Line 9, Delete "shows"
    Lines 24, 27, 32, 34 and 56, "half tone" should read --halftone--.

COLUMN 8

Line 1, "half tone" should read --halftone--.
    Lines 12 and 28, "half" should read --half- --.
    Line 48, "half tone" should read --halftone--.
    Line 61, "half" should read --half- --.

UNITED STATES PATENT AND TRADEMARK OFFICE
CERTIFICATE OF CORRECTION

PATENT NO. : 4,682,190
DATED : July 21, 1987
INVENTOR(S) : Yoshinori Ikeda

It is certified that error appears in the above-identified patent and that said Letters Patent is hereby corrected as shown below:

COLUMN 9

Line 4, "print out" should read --printout--.
    Lines 5, 7 and 42, "half tone" should read
        --halftone--.
    Line 58, "106 H." should read --106H.--.
    Lines 64 and 67, "half tone" should read
        --halftone--.

COLUMN 10

Line 31, "half" should read --half- --.
    Line 41, "half tone" should read --halftone--.
    Line 44, "half" should read --half- --.
    Lines 46 and 61, "half tone" should read
        --halftone--.

COLUMN 11

Lines 2, 10 and 14, "half tone" should read
        --halftone--.
    Line 21, "15B" should read --15D--.
    Line 24, "3B" should read --3D--.
    Line 24, "described" should read --described.--.
    Lines 48 and 61, "half tone" should read
        --halftone--.

UNITED STATES PATENT AND TRADEMARK OFFICE
CERTIFICATE OF CORRECTION

PATENT NO. : 4,682,190

DATED : July 21, 1987

INVENTOR(S) : Yoshinori Ikeda

It is certified that error appears in the above-identified patent and that said Letters Patent is hereby corrected as shown below:

COLUMN 12

Lines 3 and 6, "half tone" should read --halftone--.
    Line 15, ")0"," should read --"0",--.
    Line 17, Delete "the" (second occurrence).
    Line 21, "half tone" should read --halftone--.
    Line 22, "comprise" should read --comprises--.
    Lines 26, 27 and 28, "half tone" should read --halftone--.
    Line 35, "image/half tone" should read --image/halftone--.
    Lines 41, 43 and 61, "half tone" should read --halftone--.

COLUMN 13

Lines 1, 3, 4, 17 and 18, "half tone" should read --halftone--.
    Line 25, "FIGS. 19A," should read --FIG. 19A,--.
    Lines 25, 26 and 30, "half tone" should read --halftone--.

COLUMN 14

Line 1, "half tone" should read --halftone--.
    Line 12, "When the" should read --The--.
    Line 38, "embodiment" should read --embodiments--.
    Line 41, "I claim" should read --I claim:--.
    Lines 47 and 60, "half tone" should read --halftone--.

UNITED STATES PATENT AND TRADEMARK OFFICE
CERTIFICATE OF CORRECTION

PATENT NO.  : 4,682,190
DATED       : July 21, 1987
INVENTOR(S) : Yoshinori Ikeda It is certified that error appears in the above-identified patent and that said Letters Patent is hereby corrected as shown below:

COLUMN 15

Lines 2, 3, 7 and 14, "half tone" should read --halftone--.
    Lines 15 and 58, "dither converting" should read --dither-converting--.

COLUMN 17

Lines 24 and 64, "dither converting" should read --dither-converting--.

COLUMN 18

Line 13, "half-tone" (first occurrence) should read --halftone--.
    Line 28, "comprising:input" should read --comprising:
    input--.
    Line 39, "image" should read --the image--.

UNITED STATES PATENT AND TRADEMARK OFFICE
CERTIFICATE OF CORRECTION

PATENT NO. : 4,682,190

DATED : July 21, 1987

INVENTOR(S) : Yoshinori Ikeda

It is certified that error appears in the above-identified patent and that said Letters Patent is hereby corrected as shown below:

COLUMN 19

Line 26, "signal" should read --signal;--.

COLUMN 20

Line 12, "processing the" should read --processing
      means for processing the--.

Signed and Sealed this

Twenty-second Day of March, 1988

Attest:

DONALD J. QUIGG

*Attesting Officer*     Commissioner of Patents and Trademarks